US010276882B2

(12) United States Patent
Komatsubara et al.

(10) Patent No.: US 10,276,882 B2
(45) Date of Patent: Apr. 30, 2019

(54) FUEL CELL SYSTEM AND METHOD FOR CONTROLLING FUEL CELL SYSTEM

(71) Applicant: TOYOTA JIDOSHA KABUSHIKI KAISHA, Toyota-shi, Aichi (JP)

(72) Inventors: Kaori Komatsubara, Toyota (JP); Shigeki Hasegawa, Susono (JP); Hiromichi Sato, Hadano (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/323,575

(22) PCT Filed: Jun. 16, 2015

(86) PCT No.: PCT/JP2015/067298
§ 371 (c)(1),
(2) Date: Jan. 3, 2017

(87) PCT Pub. No.: WO2016/002503
PCT Pub. Date: Jan. 7, 2016

(65) Prior Publication Data

US 2017/0133696 A1 May 11, 2017

(30) Foreign Application Priority Data

Jul. 4, 2014 (JP) ................................ 2014-138729

(51) Int. Cl.
*H01M 8/04* (2016.01)
*H01M 8/0432* (2016.01)
(Continued)

(52) U.S. Cl.
CPC ..... *H01M 8/04373* (2013.01); *B60L 11/1892* (2013.01); *H01M 8/04* (2013.01);
(Continued)

(58) Field of Classification Search
CPC ........... H01M 8/04373; H01M 8/2457; H01M 8/04037; H01M 8/04044; H01M 8/04074; H01M 8/04701; H01M 8/241; H01M 2250/20; H01M 8/0258; H01M 8/0265; H01M 8/0267; H01M 8/04059;
(Continued)

(56) References Cited

U.S. PATENT DOCUMENTS 5,868,105 A * 2/1999 Evans ........................ F01P 3/02 123/41.42
2002/0037447 A1 * 3/2002 Imaseki .............. H01M 8/0267 429/429
(Continued)

FOREIGN PATENT DOCUMENTS

DE 10222102 A1 11/2003
JP 2003123813 A 4/2003
(Continued)

*Primary Examiner* — Anthony R Jimenez
(74) *Attorney, Agent, or Firm* — Hunton Andrews Kurth LLP

(57) ABSTRACT

A fuel cell system controls an amount of cooling water supplied to a radiator and an amount of cooling water supplied into a radiator bypass pipe by regulating a temperature of a thermostat valve by controlling a temperature of a heat medium in a housing by an air conditioning apparatus.

10 Claims, 20 Drawing Sheets

(51) Int. Cl.

| | |
|---|---|
| ***H01M 8/2457*** | (2016.01) |
| ***B60L 11/18*** | (2006.01) |
| ***H01M 8/04029*** | (2016.01) |
| ***H01M 8/04007*** | (2016.01) |
| ***H01M 8/04044*** | (2016.01) |
| ***H01M 8/04701*** | (2016.01) |
| ***H01M 8/241*** | (2016.01) |

(52) U.S. Cl.
CPC ... *H01M 8/04029* (2013.01); *H01M 8/04037* (2013.01); *H01M 8/04044* (2013.01); *H01M 8/04074* (2013.01); *H01M 8/04701* (2013.01); *H01M 8/241* (2013.01); *H01M 8/2457* (2016.02); *H01M 2250/20* (2013.01); *Y02T 90/32* (2013.01)

(58) Field of Classification Search
CPC ......... H01M 8/04134; H01M 8/04417; H01M 8/04723; H01M 8/04768; H01M 8/04813; H01M 10/60; H01M 10/61; H01M 10/61363; H01M 10/637; H01M 10/6571; H01M 10/6597
See application file for complete search history.

(56) References Cited

U.S. PATENT DOCUMENTS

| | | | |
|---|---|---|---|
| 2003/0072981 | A1 | 4/2003 | Imaseki et al. |
| 2005/0166870 | A1 | 8/2005 | Wenderoth et al. |
| 2009/0130513 | A1 | 5/2009 | Tsuchiya et al. |

FOREIGN PATENT DOCUMENTS

| | | | |
|---|---|---|---|
| JP | 2008094207 | A | 4/2008 |
| JP | 2011-189864 | A | 9/2011 |
| JP | 2013-233500 | A | 11/2013 |

* cited by examiner

CONTROL OF CONDUCTIVITY OF COOLING WATER
200
CNR>CNRTH ?
NO
YES
201a
ESTIMATION OF VOD
201b
VOD≤VODL ?
NO
YES
202
OPERATE ELECTRIC HEATER
203
SHUT OFF AIR CONDITIONING APPARATUS
204
OPERATE HEAT MEDIUM PUMP
220
CONTROL OF COOLING WATER PUMP
205
CNR≤CNRTH ?
NO
YES
206
RETURN PROCESSING
END

CONTROL OF CONDUCTIVITY OF COOLING WATER
200
CNR>CNRTH ?
NO
YES
201a
ESTIMATION OF VOD
201b
VOD≦VODL ?
NO
YES
202
OPERATE ELECTRIC HEATER
203
SHUT OFF AIR CONDITIONING APPARATUS
204
OPERATE HEAT MEDIUM PUMP
210
CONTROL OF VOD
220
CONTROL OF COOLING WATER PUMP
205
CNR≦CNRTH ?
NO
YES
206
RETURN PROCESSING
END

FUEL CELL SYSTEM AND METHOD FOR CONTROLLING FUEL CELL SYSTEM

CROSS-REFERENCE TO RELATED APPLICATIONS

This is a national phase application based on the PCT International Patent Application No. PCT/JP2015/067298 filed Jun. 16, 2015, claiming priority to Japanese Patent Application No. 2014-138729 filed Jul. 4, 2014, the entire contents of both of which are incorporated herein by reference.

TECHNICAL FIELD

The present invention relates to a fuel cell system and a method for controlling a fuel cell system.

BACKGROUND ART

There has been known a fuel cell system including: a fuel cell stack that generates power by an electrochemical reaction between fuel gas and oxidant gas; a cooling water supply pipe that links an inlet of a cooling water passage formed in the fuel cell stack, and an outlet of the cooling water passage to each other outside the fuel cell stack, whereby a circulation path for cooling water is formed; a radiator that is arranged in the cooling water supply pipe; a radiator bypass pipe that links the cooling water supply pipe between the inlet of the cooling water passage in the fuel cell stack, and the radiator, and the cooling water supply pipe between the outlet of the cooling water passage in the fuel cell stack and the radiator to each other; a cooling water pump that is arranged in the cooling water supply pipe between the inlet of the cooling water passage in the fuel cell stack and the radiator bypass pipe, and delivers cooling water; a three-way valve that controls the amount of cooling water supplied to the radiator, and the amount of cooling water supplied into the radiator bypass pipe, from cooling water flowing from the cooling water passage in the fuel cell stack into the cooling water supply pipe; and an ion exchanger that is arranged in the radiator bypass pipe, and performs ion exchange of cooling water (see, for example, Patent Literature 1).

Use of a thermostat valve as the three-way valve, which is not clearly described in Patent Literature 1, is commonly performed. The opening degree of the thermostat valve depends on the temperature of the thermostat valve, and the temperature of the thermostat valve depends on the temperature of cooling water supplied to the thermostat valve. In other words, the thermostat valve supplies a total amount of the cooling water to the radiator when the temperature of the thermostat valve is high, i.e., when the temperature of the cooling water is high. As a result, the cooling water is cooled in the radiator, and therefore, the temperature of the cooling water is decreased. In contrast, the thermostat valve supplies the total amount of the cooling water to the radiator bypass pipe when the temperature of the thermostat valve is low, i.e., when the temperature of the cooling water is low. As a result, the cooling water is not supplied to the radiator, and therefore, the temperature of the cooling water is inhibited from decreasing.

Because ionic impurities are gradually mixed from the radiator, the pipes, and the like into the cooling water, the conductivity of the cooling water gradually increases. The high conductivity of the cooling water may cause liquid junction and the like, and is unfavorable. Thus, in Patent Literature 1, the ion exchanger that can remove ionic impurities from the cooling water is arranged in the radiator bypass pipe.

CITATION LIST

Patent Literature

[Patent Literature 1] Japanese Laid-open Patent Publication No. 2013-233500

SUMMARY OF INVENTION

Technical Problem

However, in Patent Literature 1, the total amount of the cooling water is supplied to the radiator, i.e., the cooling water is not supplied to the radiator bypass pipe when the temperature of the cooling water is high. Therefore, when the temperature of the cooling water is high, the cooling water does not pass through the ion exchanger, and therefore, ionic impurities in the cooling water are not removed by the ion exchanger. Therefore, the continuation of the high-temperature state of the cooling water may result in an excessive increase in the amount of the ionic impurities in the cooling water, and in an excessive increase in the conductivity of the cooling water.

Solution to Problem

In accordance with an aspect of the present invention, there is provided a fuel cell system including: a fuel cell stack configured to generate power by an electrochemical reaction between fuel gas and oxidant gas; a cooling water supply pipe connecting an inlet of a cooling water passage formed in the fuel cell stack and an outlet of the cooling water passage to each other outside the fuel cell stack, whereby a circulation path for cooling water is formed; a radiator arranged in the cooling water supply pipe; a radiator bypass pipe connecting the cooling water supply pipe between the inlet of the cooling water passage in the fuel cell stack and the radiator, and the cooling water supply pipe between the outlet of the cooling water passage in the fuel cell stack and the radiator to each other; a cooling water pump arranged in the cooling water supply pipe between the inlet of the cooling water passage in the fuel cell stack and the radiator bypass pipe, or in the cooling water supply pipe between the outlet of the cooling water passage and the radiator bypass pipe, and configured to deliver cooling water; a thermostat valve configured to control the amount of cooling water supplied to the radiator and the amount of cooling water supplied into the radiator bypass pipe, from cooling water flowing from the cooling water passage in the fuel cell stack into the cooling water supply pipe, the thermostat valve supplying a total amount of the cooling water to the radiator when the temperature of the thermostat valve is higher than a set temperature that is preset, and supplying at least a portion of the cooling water to the radiator bypass pipe and supplying a remainder to the radiator when the temperature of the thermostat valve is lower than the set temperature; an ion exchanger arranged in the radiator bypass pipe and configured to perform ion exchange of cooling water; an air conditioning apparatus including a heat medium circulation pipe through which a heat medium is circulated, a heat medium pump arranged in the heat medium circulation pipe and configured to deliver the heat medium, and a heat exchanger arranged in the heat medium circulation pipe and configured to perform heat exchange of air and the heat medium with each other; and a housing arranged in the heat medium circulation pipe, and disposed to surround the thermostat valve, wherein the temperature of the thermostat valve is regulated by controlling the temperature of the heat medium in the housing by the air conditioning apparatus, whereby the amount of cooling water supplied to the radiator, and the amount of cooling water supplied into the radiator bypass pipe can be controlled.

In accordance with another aspect of the present invention, there is provided a method for controlling a fuel cell system including: a fuel cell stack configured to generate power by an electrochemical reaction between fuel gas and oxidant gas; a cooling water supply pipe connecting an inlet of a cooling water passage formed in the fuel cell stack and an outlet of the cooling water passage to each other outside the fuel cell stack, whereby a circulation path for cooling water is formed; a radiator arranged in the cooling water supply pipe; a radiator bypass pipe connecting the cooling water supply pipe between the inlet of the cooling water passage in the fuel cell stack and the radiator, and the cooling water supply pipe between the outlet of the cooling water passage in the fuel cell stack and the radiator to each other; a cooling water pump arranged in the cooling water supply pipe between the inlet of the cooling water passage in the fuel cell stack and the radiator bypass pipe, or in the cooling water supply pipe between the outlet of the cooling water passage and the radiator bypass pipe, and configured to deliver cooling water; a thermostat valve configured to control the amount of cooling water supplied to the radiator and the amount of cooling water supplied into the radiator bypass pipe, from cooling water flowing from the cooling water passage in the fuel cell stack into the cooling water supply pipe, the thermostat valve supplying a total amount of the cooling water to the radiator when the temperature of the thermostat valve is higher than a set temperature that is preset, and supplying at least a portion of the cooling water to the radiator bypass pipe and supplying a remainder to the radiator when the temperature of the thermostat valve is lower than the set temperature; an ion exchanger arranged in the radiator bypass pipe and configured to perform ion exchange of cooling water; an air conditioning apparatus including a heat medium circulation pipe through which a heat medium is circulated, a heat medium pump arranged in the heat medium circulation pipe and configured to deliver the heat medium, and a heat exchanger arranged in the heat medium circulation pipe and configured to perform heat exchange of air and the heat medium with each other; and a housing arranged in the heat medium circulation pipe, and disposed to surround the thermostat valve, wherein the temperature of the thermostat valve is regulated by controlling the temperature of the heat medium in the housing by the air conditioning apparatus, whereby the amount of cooling water supplied to the radiator, and the amount of cooling water supplied into the radiator bypass pipe are controlled.

Advantageous Effects of Invention

The conductivity of cooling water can be prevented from excessively increasing.

DESCRIPTION OF EMBODIMENTS

Figure 1:
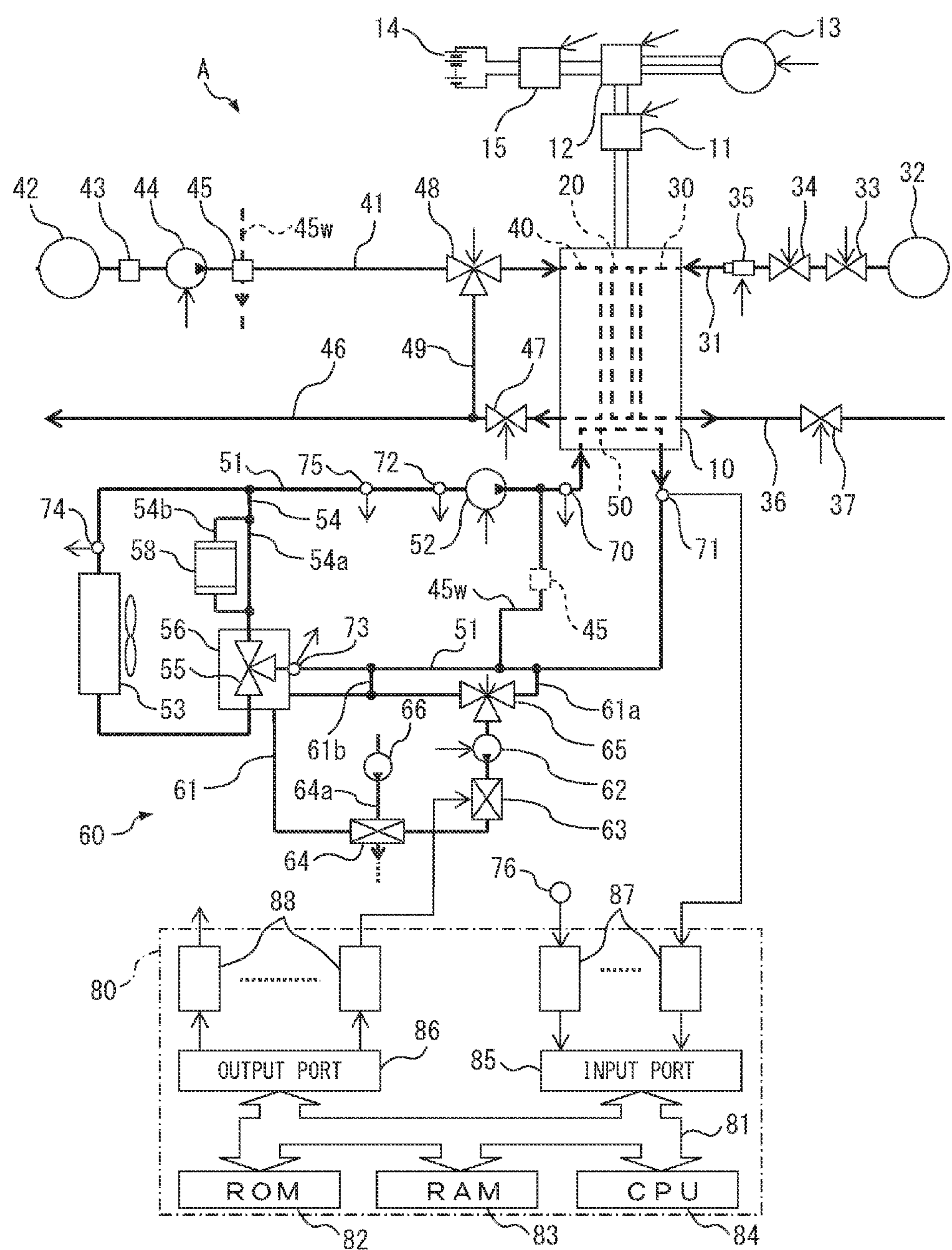
FIG. 1 is a configuration view of a fuel cell system.

With reference to FIG. 1, a fuel cell system A includes a fuel cell stack 10. The fuel cell stack 10 includes a plurality of single fuel cells that are layered one on another in a layering direction. Each single fuel cell includes a membrane electrode assembly 20. The membrane electrode assembly 20 includes a membranous electrolyte, an anode electrode formed on one side of the electrolyte, and a cathode electrode formed on the other side of the electrolyte.

The anode and cathode electrodes of the single fuel cells are each electrically connected in series to configure the electrodes of the fuel cell stack 10. The electrodes of the fuel cell stack 10 are connected electrically to an inverter 12 via a DC/DC converter 11, and the inverter 12 is connected electrically to a motor generator 13. Further, the fuel cell system A includes a capacitor 14, and the capacitor 14 is connected electrically to the above-described inverter 12 via a DC/DC converter 15. The DC/DC converter 11 is intended to increase voltage from the fuel cell stack 10 and to send the voltage to the inverter 12, and the inverter 12 is intended to convert direct current from the DC/DC converter 11 or the capacitor 14 into alternating current. The DC/DC converter 15 is intended to decrease voltage from the fuel cell stack 10 or the motor generator 13 to the capacitor 14, or to increase voltage from the capacitor 14 to the motor generator 13. In the fuel cell system A illustrated in FIG. 1, the capacitor 14 includes a battery.

A fuel gas flow passage for supplying fuel gas to the anode electrode, an oxidant gas flow passage for supplying oxidant gas to the cathode electrode, and a cooling water flow passage for supplying cooling water to the single fuel cell are formed in each single fuel cell. The fuel gas flow passages, oxidant gas flow passages, and cooling water flow passages of the plurality of single fuel cells are each connected in series, thereby forming a fuel gas passage 30, an oxidant gas passage 40, and a cooling water passage 50 in the fuel cell stack 10, respectively.

A fuel gas supply pipe 31 is linked to the inlet of the fuel gas passage 30. The fuel gas supply pipe 31 is linked to a fuel gas source 32. In an embodiment illustrated in FIG. 1, the fuel gas is formed of hydrogen gas, and the fuel gas source 32 is formed of a hydrogen tank. A shut-off valve 33, a regulator 34 that adjusts the pressure of fuel gas in the fuel gas supply pipe 31, and a fuel gas injector 35 for supplying fuel gas from the fuel gas source 32 to the fuel cell stack 10 are arranged in the order from the upstream side in the fuel gas supply pipe 31. In contrast, an anode off-gas pipe 36 is linked to the outlet of the fuel gas passage 30. Fuel gas in the fuel gas source 32 is supplied into the fuel gas passage 30 in the fuel cell stack 10 through the fuel gas supply pipe 31 when the shut-off valve 33 is opened and the valve of the fuel gas injector 35 is opened. In this case, gas flowing from the fuel gas passage 30, i.e., anode off-gas flows into the anode off-gas pipe 36. An anode off-gas control valve 37 that controls the amount of the anode off-gas flowing in the anode off-gas pipe 36 or the pressure in the fuel gas passage 30 of the fuel cell stack 10 is arranged in the anode off-gas pipe 36.

An oxidant gas supply pipe 41 is linked to the inlet of the oxidant gas passage 40. The oxidant gas supply pipe 41 is linked to an oxidant gas source 42. In the embodiment illustrated in FIG. 1, the oxidant gas is formed of air, and the oxidant gas source 42 is formed of atmospheric air. A gas cleaner 43, a compressor 44 that force-feeding oxidant gas, and an intercooler 45 for cooling oxidant gas sent from the compressor 44 to the fuel cell stack 10 are arranged in the order from the upstream in the oxidant gas supply pipe 41. In contrast, a cathode off-gas pipe 46 is linked to the outlet of the oxidant gas passage 40. When the compressor 44 is driven, oxidant gas is supplied into the oxidant gas passage 40 in the fuel cell stack 10 through the oxidant gas supply pipe 41. In this case, gas flowing from the oxidant gas passage 40, i.e., cathode off-gas flows into the cathode off-gas pipe 46. A cathode off-gas control valve 47 that controls the amount of the cathode off-gas flowing in the cathode off-gas pipe 46 or the pressure in the oxidant gas passage 40 of the fuel cell stack 10 is arranged in the cathode off-gas pipe 46.

In the fuel cell system A illustrated in FIG. 1, the oxidant gas supply pipe 41 downstream of the compressor 44 and the cathode off-gas pipe 46 downstream of the cathode off-gas control valve 47 are linked to each other via a stack bypass pipe 49. Furthermore, there is disposed a stack bypass control valve 48 that controls the amount of oxidant gas flowing from the oxidant gas supply pipe 41 into the stack by-pass pipe 49 and the amount of oxidant gas supplied to the fuel cell stack 10. In the fuel cell system A illustrated in FIG. 1, the stack bypass control valve 48 is formed of an electromagnetic three-way valve, and is arranged in the inlet of the stack bypass pipe 49.

One end of a cooling water supply pipe 51 is linked to the inlet of the cooling water passage 50, and the other end of the cooling water supply pipe 51 is linked to the outlet of the cooling water passage 50. A cooling water pump 52 that force-feeds cooling water, and a radiator 53 are arranged in the cooling water supply pipe 51. The cooling water supply pipe 51 between the inlet of the cooling water passage 50 of the fuel cell stack 10 and the radiator 53, and the cooling water supply pipe 51 between the outlet of the cooling water passage 50 of the fuel cell stack 10 and the radiator 53 are linked to each other via a radiator bypass pipe 54. There is disposed a thermostat valve 55 that controls the amount of cooling water supplied to the radiator 53, and the amount of cooling water supplied into the radiator bypass pipe 54, from cooling water flowing from the cooling water passage 50 of the fuel cell stack 10 into the cooling water supply pipe 51. The thermostat valve 55 supplies a total amount of cooling water to the radiator 53 when the temperature of the thermostat valve 55 is higher than a set temperature that is preset, and supplies at least a portion of the cooling water to the radiator bypass pipe 54 and supplies the remainder to the radiator 53 when the temperature of thermostat valve 55 is lower than the set temperature. In the fuel cell system A illustrated in FIG. 1, the thermostat valve 55 is formed of a three-way valve, and is arranged in the inlet of the radiator bypass pipe 54.

In the fuel cell system A illustrated in FIG. 1, the radiator bypass pipe 54 includes a radiator bypass pipe portion 54*a* and a radiator bypass pipe portion 54*b* that extend in parallel to each other. A portion of cooling water flowing into the radiator bypass pipe 54 flows in the radiator bypass pipe portion 54*a*, and the remainder flows in the radiator bypass pipe portion 54*b*. An ion exchanger 58 that performs ion exchange of cooling water is arranged in the radiator bypass pipe portion 54*b*. When cooling water flows in the ion exchanger 58, ionic impurities are removed from the cooling water by ion exchange in the ion exchanger 58, and therefore, the conductivity of the cooling water is decreased. In the fuel cell system A illustrated in FIG. 1, any ion exchanger is not arranged in the radiator bypass pipe portion 54*a*. In other words, the portion of the cooling water flowing into the radiator bypass pipe 54 is guided into the ion exchanger 58. In such a manner, the flow passage resistance of the radiator bypass pipe 54 is maintained at a low level. Further, the durability of the ion exchanger 58 is improved because the amount of cooling water passing through the ion exchanger 58 is reduced. In another embodiment which is not illustrated, the radiator bypass pipe 54 includes neither the radiator bypass pipe portion 54*a* nor the radiator bypass pipe portion 54*b* but includes a single flow passage, and the ion exchanger 58 is arranged in the single flow passage.

When the cooling water pump 52 is driven, cooling water discharged from the cooling water pump 52 flows into the cooling water passage 50 in the fuel cell stack 10 through the cooling water supply pipe 51, then flows into the cooling water supply pipe 51 through the cooling water passage 50, and returns to the cooling water pump 52 through the radiator 53 or the radiator bypass pipe 54. As described above, the cooling water supply pipe 51 links the inlet of the cooling water passage 50 and the outlet of the cooling water passage 50 to each other outside the fuel cell stack 10, thereby forming a circulation path for cooling water. In the embodiment illustrated in FIG. 1, the cooling water pump 52 is arranged in the cooling water supply pipe 51 between the inlet of the cooling water passage 50 of the fuel cell stack 10 and the outlet of the radiator bypass pipe 54. In another embodiment which is not illustrated, the cooling water pump 52 is arranged in the cooling water supply pipe 51 between the outlet of the cooling water passage 50 and the inlet of the radiator bypass pipe 54.

Furthermore, there is disposed an intercooler bypass pipe 45*w* that links the cooling water supply pipe 51 between the outlet of the cooling water pump 52 and the inlet of the cooling water passage 50, and the cooling water supply pipe 51 between the outlet of the cooling water passage 50 and the inlet of the radiator bypass pipe 54. The above-described intercooler 45 includes: an oxidant gas flow passage through which oxidant gas to be cooled flows; and a refrigerant flow passage through which a refrigerant flows. The oxidant gas flow passage is linked to the above-described oxidant gas supply pipe 41. The cooling water of the fuel cell stack 10 is used as the refrigerant of the intercooler 45, and the refrigerant flow passage is linked to the intercooler bypass pipe 45*w*.

An air conditioning apparatus 60 that regulates the temperature in the passenger compartment of an electrically driven vehicle is disposed in the fuel cell system A illustrated in FIG. 1. A heat medium circulation pipe 61 through which a heat medium is circulated is disposed in the air conditioning apparatus 60, and a heat medium pump 62 that delivers the heat medium, an electric heater 63 that heats the heat medium, and a heat exchanger 64 that performs heat exchange of air for air conditioning and the heat medium with each other are arranged in the heat medium circulation pipe 61. The heat exchanger 64 includes a heat medium flow passage through which the heat medium flows, and an air flow passage 64*a* through which the air for air conditioning flows, and the heat medium flow passage is linked to the heat medium circulation pipe 61. The inlet of the air flow passage 64*a* is linked to a blower 66, and the outlet of the air flow passage 64*a* is linked to the passenger compartment. Furthermore, the fuel cell system A illustrated in FIG. 1 includes a housing 56 disposed to seal and surround the thermostat valve 55. In other words, the thermostat valve 55 is housed in the housing 56. The housing 56 is arranged in the heat medium circulation pipe 61, and therefore, the heat medium is filled into the housing 56. In the embodiment illustrated in FIG. 1, the heat medium of the air conditioning apparatus 60 includes water.

Furthermore, the cooling water supply pipe 51 and the air conditioning apparatus 60 can communicate with each other in the fuel cell system A illustrated in FIG. 1. In other words, the cooling water supply pipe 51 and the heat medium circulation pipe 61 are linked to each other, on the one hand, via a communicating pipe 61*a* and an electromagnetic three-way valve 65, and on the other hand, via a communicating pipe 61*b*. In this case, the three-way valve 65 is arranged in, for example, the heat medium circulation pipe 61 between the outlet of the housing 56 and the inlet of the heat medium pump 62. The three-way valve 65 links the heat medium circulation pipe 61 reaching the heat medium pump 62, on the one hand, to the cooling water supply pipe 51 between the outlet of the cooling water passage 50 of the fuel cell stack 10 and the inlet of the radiator bypass pipe 54 via the communicating pipe 61*a*, and on the other hand, to the outlet of the housing 56 via the heat medium circulation pipe 61. Further, the heat medium circulation pipe 61 between the outlet of the housing 56 and the three-way valve 65, and the cooling water supply pipe 51 between the outlet of the cooling water passage 50 and the inlet of the radiator bypass pipe 54 are linked to each other via the communicating pipe 61*b*.

Figure 2:
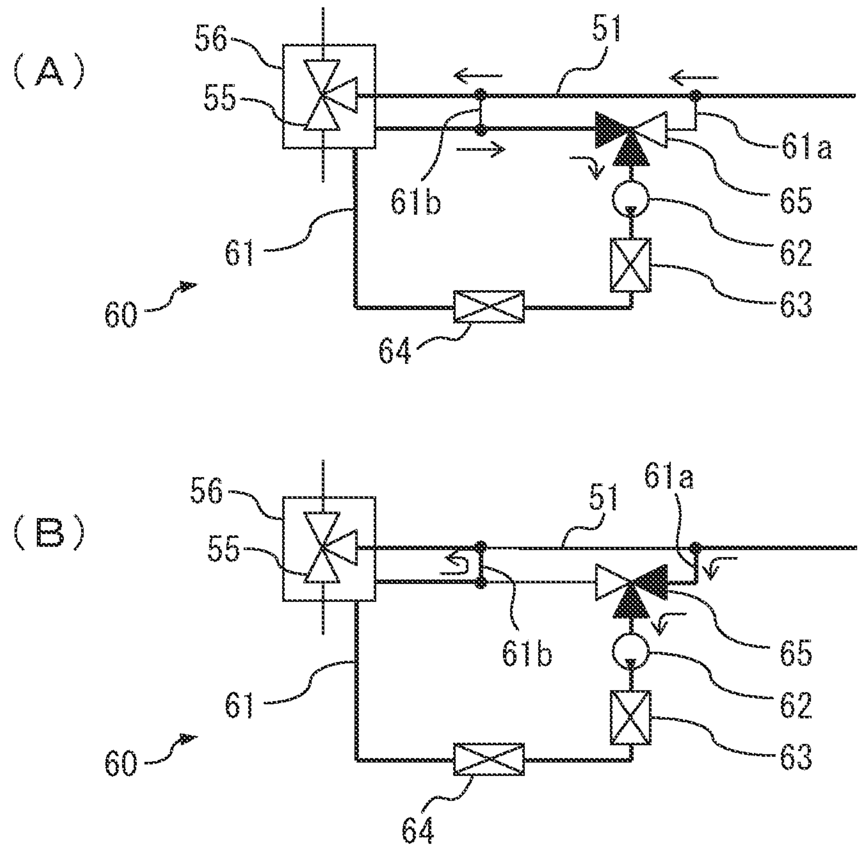
FIG. 2 is a schematic view for explaining the flows of cooling water and a heat medium.

FIG. 2(A) illustrates a case in which the cooling water supply pipe 51 and the air conditioning apparatus 60 are shut off from each other. In this case, the three-way valve 65 shuts off the communication between the communicating pipe 61*a* and the heat medium circulation pipe 61, and permits the heat medium to flow from the housing 56 to the heat medium pump 62. In this case, therefore, when the heat medium pump 62 is operated, the heat medium discharged from the heat medium pump 62 sequentially flows in the electric heater 63, the heat exchanger 64, and the housing 56, and returns to the heat medium pump 62. The cooling water in the cooling water supply pipe 51 goes to the thermostat valve 55 without flowing into the heat medium circulation pipe 61. In contrast, FIG. 2(B) illustrates a case in which the cooling water supply pipe 51 and the air conditioning apparatus 60 communicate with each other. In this case, the three-way valve 65 shuts off the flow of the heat medium from the housing 56 to the heat medium pump 62, and allows the cooling water supply pipe 51 and the heat medium circulation pipe 61 to communicate with each other via the communicating pipe 61*a*. In this case, therefore, at least a portion of the cooling water in the cooling water supply pipe 51 flows into the heat medium circulation pipe 61 through the communicating pipe 61*a* and the three-way valve 65, then sequentially flows in the heat medium pump 62, the electric heater 63, the heat exchanger 64, and the housing 56, and then returns to the cooling water supply pipe 51 through the communicating pipe 61*b*. In this case, the cooling water can flow in the heat medium circulation pipe 61 even when the heat medium pump 62 is not operated. In another embodiment which is not illustrated, the cooling water supply pipe 51 between the outlet of the radiator bypass pipe 54 and the inlet of the cooling water passage 50, and the heat medium circulation pipe 61 are linked to each other, on the one hand, via the communicating pipe 61*a* and the three-way valve 65, and on the other hand, via the communicating pipe 61*b*. In each embodiment, the inlet of the communicating pipe 61*a* is disposed upstream of the outlet of the communicating pipe 61*b* with regard to the flow of the cooling water in the cooling water supply pipe 51.

When the temperature of cooling water in the cooling water supply pipe 51 is lower than a predetermined set water temperature in the case of needing an increase in temperature in the passenger compartment, the three-way valve 65 is controlled to shut off the cooling water supply pipe 51 and the heat medium circulation pipe 61 from each other, and the heat medium pump 62, the electric heater 63, and the blower 66 are operated. As a result, a heat medium discharged from the heat medium pump 62 is heated by the electric heater 63, air from the blower 66 is heated in the heat exchanger 64 by the heated heat medium, and the heated air is sent into the passenger compartment. In contrast, when the temperature of the cooling water in the cooling water supply pipe 51 is higher than the set water temperature in the case of needing an increase in temperature in the passenger compartment, the three-way valve 65 is controlled to allow the cooling water supply pipe 51 and the heat medium circulation pipe 61 to communicate with each other, the heat medium pump 62 and the electric heater 63 are stopped, and the blower 66 is operated. As a result, the high-temperature cooling water flows from the cooling water supply pipe 51 into the heat medium circulation pipe 61. Air from blower 66 is heated in the heat exchanger 64 by the high-temperature cooling water, and the heated air is sent into the passenger compartment. In this case, the cooling water acts as a heat medium. In such a manner, the temperature in the passenger compartment can be increased, and thermal energy possessed by the cooling water can be effectively utilized, with operating neither the heat medium pump 62 nor the electric heater 63. The above-described set water temperature is set depending on the target temperature of air sent into the passenger compartment.

The electronic control unit 80 includes a digital computer, and includes read-only memory (ROM) 82, random-access memory (RAM) 83, a microprocessor (CPU) 84, an input port 85, and an output port 86, connected to each other via a bidirectional bus 81. A temperature sensor 70 that detects the temperature of cooling water is mounted on the inlet of the cooling water passage 50 of the fuel cell stack 10. A temperature sensor 71 that detects the temperature of cooling water is mounted on the outlet of the cooling water passage 50 of the fuel cell stack 10. A temperature sensor 72 that detects the temperature of cooling water is mounted on the cooling water supply pipe 51 between the radiator bypass pipe 54 and the cooling water pump 52. A temperature sensor 73 that detects the temperature of the thermostat valve 55 is mounted on the housing 56 that surrounds the thermostat valve 55 or on the thermostat valve 55. A conductivity sensor 74 that measures the conductivity of cooling water is mounted around the radiator 53, for example, on the cooling water supply pipe 51 in the vicinity of the outlet of the radiator 53. A conductivity sensor 75 that measures the conductivity of cooling water is mounted on the cooling water supply pipe 51 between the radiator bypass pipe 54 and the fuel cell stack 10. Further, a temperature sensor 76 that detects external temperature is disposed. Output signals from the temperature sensors 70, 71, 72, 73, and 76, and the conductivity sensors 74 and 75 are input to the input port 85 via corresponding AD converters 67. The output port 86 is connected electrically to the shut-off valve 33, the regulator 34, the fuel gas injector 35, the anode off-gas control valve 37, the compressor 44, the cathode off-gas control valve 47, the stack bypass control valve 48, the cooling water pump 52, the heat medium pump 62, the electric heater 63, and the three-way valve 65 via corresponding driving circuits 88.

Figure 3:
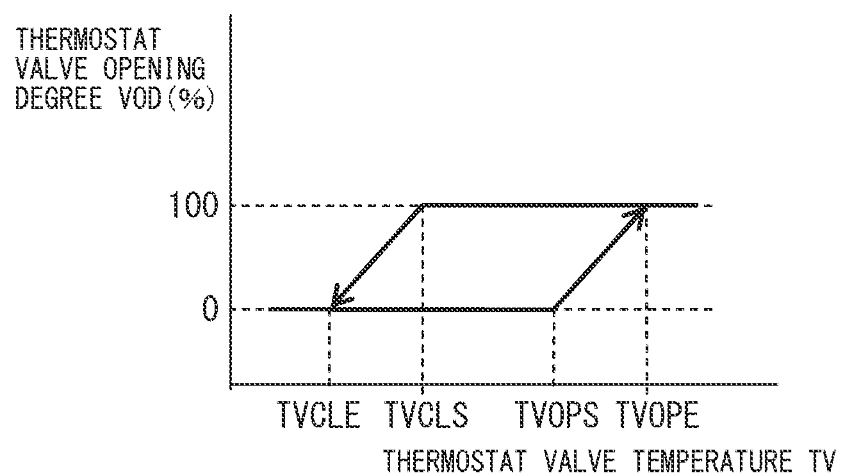
FIG. 3 is a graph representing a relationship between a thermostat valve opening degree and a thermostat valve temperature.

In the fuel cell system A illustrated in FIG. 1, the opening degree of the thermostat valve 55 has a hysteresis property for the temperature of the thermostat valve 55. FIG. 3 represents a relationship between the opening degree VOD of the thermostat valve 55 of the embodiment illustrated in FIG. 1 (hereinafter referred to as a thermostat valve opening degree) and the temperature TV of the thermostat valve 55 (hereinafter referred to as a thermostat valve temperature). When the thermostat valve temperature TV is higher than a valve opening end temperature TVOPE at the end of opening the valve, the thermostat valve opening degree VOD is 100%, i.e., the thermostat valve 55 is in a fully open state. When the thermostat valve 55 is in the fully open state, a total amount of cooling water is supplied to the radiator 53. In contrast, when the thermostat valve 55 is in a fully closed state, the total amount of the cooling water is supplied to the radiator bypass pipe 54. When the thermostat valve opening degree VOD is an intermediate opening degree between the fully open and fully closed states, a portion of the cooling water is supplied to the radiator 53, and the remainder is supplied to the radiator bypass pipe 54.

When the thermostat valve temperature TV decreases from a state in which the thermostat valve opening degree VOD is 100%, the thermostat valve opening degree VOD is maintained at 100% while the thermostat valve temperature TV is higher than a valve closing start temperature TVCLS at the start of closing the valve. Then, when the thermostat valve temperature TV reaches the valve closing start temperature TVCLS at the start of closing the valve, the thermostat valve 55 starts to close, i.e., the thermostat valve opening degree VOD starts to decrease. Then, when the thermostat valve temperature TV reaches a valve closing end temperature TVCLE at the end of closing the valve (<TVCLS), the thermostat valve opening degree VOD reaches 0%, i.e., becomes in a fully closed state. When the thermostat valve temperature TV is lower than the valve closing end temperature TVCLE at the end of closing the valve, the thermostat valve opening degree VOD is maintained at 0%.

In contrast, when the thermostat valve temperature TV increases from a state in which the thermostat valve opening degree VOD is 0%, the thermostat valve opening degree VOD is maintained at 0% while the thermostat valve temperature TV is lower than a valve opening start temperature TVOPS at the start of opening the valve. Then, when the thermostat valve temperature TV reaches the valve opening start temperature TVOPS at the start of opening the valve, the thermostat valve 55 starts to open, i.e., the thermostat valve opening degree VOD starts to increase. Then, when the thermostat valve temperature TV reaches a valve opening end temperature TVOPE at the end of opening the valve (TVOPS), the thermostat valve opening degree VOD reaches 100%, i.e., becomes in a fully open state. In an example represented in FIG. 3, the thermostat valve opening degree VOD is an intermediate opening degree at the thermostat valve temperature TV between the valve closing start temperature TVCLS at the start of closing the valve and the valve closing end temperature TVCLE at the end of closing the valve when the thermostat valve temperature TV decreases, and the thermostat valve opening degree VOD is an intermediate opening degree at the thermostat valve temperature TV between the valve opening start temperature TVOPS at the start of opening the valve and the valve opening end temperature TVOPE at the end of opening the valve when the thermostat valve temperature TV increases. In another embodiment which is not illustrated, the valve closing start temperature TVCLS at the start of closing the valve and the valve closing end temperature TVCLE at the end of closing the valve are set to be equal to each other, and the valve opening start temperature TVOPS at the start of opening the valve and the valve opening end temperature TVOPE at the end of opening the valve are set to be equal to each other. In this case, the thermostat valve opening degree VOD varies in a stepwise manner, and does not become an intermediate opening degree. In still another embodiment which is not illustrated, the thermostat valve opening degree has no hysteresis property. In other words, the valve closing end temperature TVCLE at the end of closing the valve and the valve opening start temperature TVOPS at the start of opening the valve are set to be equal to each other, and the valve closing start temperature TVCLS at the start of closing the valve and the valve opening end temperature TVOPE at the end of opening the valve are set to be equal to each other.

As described above, the thermostat valve opening degree VOD depends on the thermostat valve temperature TV. In the fuel cell system A illustrated in FIG. 1, the thermostat valve 55 is housed in the housing 56, and therefore, the thermostat valve temperature TV depends on the temperature of a fluid flowing in the thermostat valve 55, and on the temperature of a heat medium in the housing 56. More specifically, the thermostat valve temperature TV depends principally on the temperature of cooling water flowing in the thermostat valve 55 when the air conditioning apparatus 60 is stopped, and therefore, no heat medium flows within the housing 56. In contrast, the thermostat valve temperature TV depends on the temperature of cooling water flowing in the thermostat valve 55, and on the temperature of a heat medium in the housing 56 when the air conditioning apparatus 60 is operated, and therefore, the heat medium flows within the housing 56.

The temperature of the heat medium in the housing 56 can be controlled by the air conditioning apparatus 60. Specifically, when the heat medium pump 62 is operated while operating the electric heater 63, a heat medium having high temperature is supplied into the housing 56, and therefore, the temperature of the heat medium in the housing 56 is increased. In contrast, when the heat medium pump 62 is operated while stopping the electric heater 63, a heat medium having low temperature, i.e., around an external temperature, is supplied into the housing 56, and therefore, the temperature of the heat medium in the housing 56 is decreased.

In a case in which the temperature of the heat medium in the housing 56 is increased by the air conditioning apparatus 60, thereby increasing the thermostat valve temperature TV to, for example, a temperature that is higher than the valve opening end temperature TVOPE at the end of opening the valve, the thermostat valve 55 is fully opened (VOD=100%) even when the temperature of cooling water flowing in the thermostat valve 55 is low. Alternatively, in a case in which the temperature of the heat medium in the housing 56 is decreased by the air conditioning apparatus 60, thereby decreasing the thermostat valve temperature TV to, for example, a temperature that is lower than the valve closing end temperature TVCLE at the end of closing the valve (for example, 50° C.), the thermostat valve 55 is fully closed (VOD=0%) even when the temperature of the cooling water flowing in the thermostat valve 55 is high. In such a manner, the thermostat valve opening degree VOD is controlled by controlling the temperature of the heat medium in the housing 56 by the air conditioning apparatus 60.

As a result, in the fuel cell system A illustrated in FIG. 1, the thermostat valve temperature TV is regulated by controlling the temperature of the heat medium in the housing 56 by the air conditioning apparatus 60, thereby regulating the thermostat valve opening degree VOD, whereby the amount of cooling water supplied to the radiator 53, and the amount of cooling water supplied into the radiator bypass pipe 54 or the ion exchanger 58 can be controlled. In this regard, the thermostat valve temperature TV or the thermostat valve opening degree VOD can be controlled without the need for an additional configuration in consideration of the fact that an electrically driven vehicle commonly includes an air conditioning apparatus. Commonly, the amount of a heat medium circulating in the air conditioning apparatus 60 is less than the amount of cooling water circulating in the cooling water supply pipe 51. Therefore, the thermostat valve opening degree VOD can be controlled with high responsivity by controlling the thermostat valve temperature TV by the air conditioning apparatus 60.

When it is needed to generate electricity with the fuel cell stack 10, the shut-off valve 33 and the fuel gas injector 35 are opened to supply hydrogen gas to the fuel cell stack 10. Further, the compressor 44 is driven to supply air to the fuel cell stack 10. As a result, an electrochemical reaction ($H_2 \rightarrow 2H^+ + 2e^-$, $(1/2)O_2 + 2H^+ + 2e^- \rightarrow H_2O$) occurs in the single fuel cells, and electrical energy is generated. The generated electrical energy is sent to the motor generator 13. As a result, the motor generator 13 is operated as an electric motor for driving a vehicle, and the electrically driven vehicle is driven. In contrast, for example, when the vehicle is braked, the motor generator 13 is operated as a regenerative apparatus, and electrical energy regenerated at this time is stored in the capacitor 14.

In the fuel cell system A illustrated in FIG. 1, the amount of cooling water from the cooling water pump 52 is controlled so that a cooling water temperature representing the temperature of the fuel cell stack 10 is maintained within a preset target temperature range. Specifically, the amount of the cooling water needed for maintaining the cooling water temperature detected by the temperature sensor 71 within the preset target temperature range, i.e., the target amount of the cooling water is calculated. Then, the cooling water pump 52 is controlled so that the amount of the cooling water discharged from the cooling water pump 52 becomes the target amount of the cooling water.

Next, a first embodiment according to the present invention will be described. When a thermostat valve opening degree VOD is less than 100%, at least a portion of cooling water flows into the radiator bypass pipe 54, and a portion of the cooling water flowing into the radiator bypass pipe 54 flows into the ion exchanger 58. Therefore, the conductivity of the cooling water is decreased. However, for example, when an electrically driven vehicle makes a long ascent, the temperature of cooling water is maintained at a high level for long time. As a result, the thermostat valve opening degree VOD is maintained at 100% for long time, and there is a fear that the cooling water is prevented from being guided to the radiator bypass pipe 54 or the ion exchanger 58. As a result, there is a fear that the conductivity becomes excessively high.

Thus, in the first embodiment according to the present invention, when the thermostat valve opening degree VOD is 100% and the conductivity of cooling water is more than a threshold value, a thermostat valve temperature TV is temporarily decreased by the air conditioning apparatus 60 to temporarily decrease the thermostat valve opening degree VOD, thereby guiding the cooling water to the radiator bypass pipe 54 or the ion exchanger 58. This will be described with reference to FIG. 4.

Figure 4:
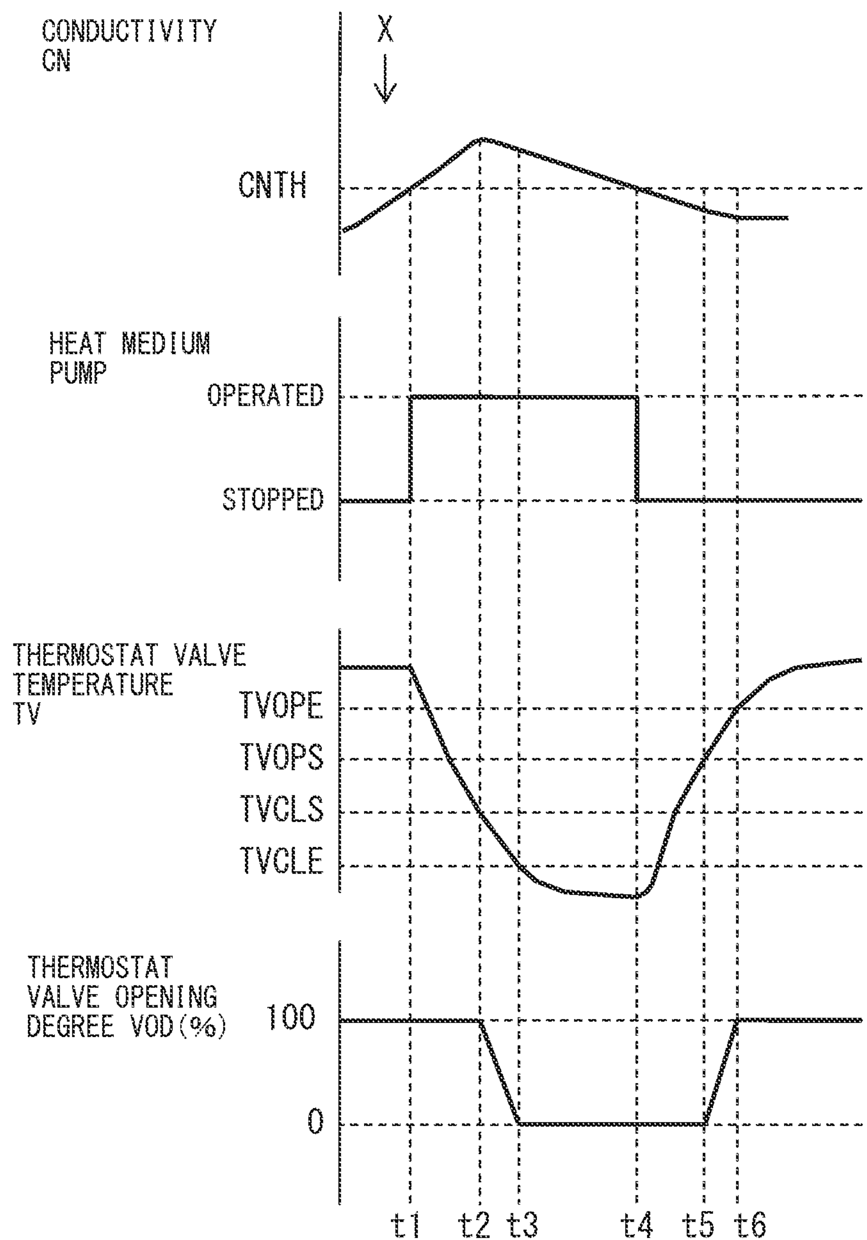
FIG. 4 is a timing chart for explaining the control of the conductivity of cooling water in a first embodiment according to the present invention.

In FIG. 4, X indicates a state in which the thermostat valve temperature TV is higher than a valve opening end temperature TVOPE at the end of opening the valve, i.e., a state in which the thermostat valve opening degree VOD is 100%. In the state, a total amount of cooling water is supplied to the radiator 53, and the cooling water is not supplied to the radiator bypass pipe 54 with the ion exchanger 58. Therefore, the conductivity CN of the cooling water detected by the conductivity sensor 75 gradually increases. When the conductivity CN becomes higher than a preset threshold value CNTH at time t1, the control of the thermostat valve opening degree VOD by the air conditioning apparatus 60 is started. In other words, the electric heater 63 is switched to a stopping state when the electric heater 63 of the air conditioning apparatus 60 is in an operating state, while the electric heater 63 is maintained in a stopping state when the electric heater 63 is in the stopping state. Further, the air conditioning apparatus 60 is switched to or maintained in the state of being shut off from the cooling water supply pipe 51. Furthermore, the heat medium pump 62 is switched to or maintained in an operating state. As a result, a low-temperature heat medium flows in the housing 56, and therefore, the thermostat valve temperature TV starts to decrease. Then, when the thermostat valve temperature TV reaches a valve closing start temperature TVCLS at the start of closing the valve at time t2, the thermostat valve opening degree VOD starts to decrease, i.e., the thermostat valve 55 starts to be closed. Thus, a portion of the cooling water starts to flow to the radiator bypass pipe 54 or the ion exchanger 58. As a result, the conductivity CN of the cooling water starts to decrease. Then, when the thermostat valve temperature TV reaches a valve closing end temperature TVCLE at the end of closing the valve at time t3, the thermostat valve opening degree VOD becomes 0%, i.e., the thermostat valve 55 becomes in a fully closed state. As a result, the total amount of the cooling water flows to the radiator bypass pipe 54 or the ion exchanger 58. As a result, the conductivity CN of the cooling water further decreases. Then, when the conductivity CN of the cooling water becomes the threshold value CNTH or less at time t4, the control of the thermostat valve opening degree VOD by the air conditioning apparatus 60 is ended, and return processing is carried out. In other words, the electric heater 63 is returned to an operating state, or is maintained in a stopping state. Further, the air conditioning apparatus 60 is returned to the state of being connected to the cooling water supply pipe 51, or is maintained in the state of being shut off from the cooling water supply pipe 51. Furthermore, the heat medium pump 62 is returned to a stopping state, or is maintained in an operating state. As a result, the thermostat valve temperature TV is gradually increased by the cooling water flowing in the thermostat valve 55. Then, when the thermostat valve temperature TV reaches a valve opening start temperature TVOPS at the start of opening the valve at time t5, the thermostat valve opening degree VOD starts to increase, i.e., the thermostat valve 55 starts to be opened. As a result, a portion of the cooling water starts to flow to the radiator 53. As a result, the temperature of the cooling water is decreased by the radiator 53. Then, when the thermostat valve temperature TV reaches the valve opening end temperature TVOPE at the end of opening the valve at time t6, the thermostat valve opening degree VOD returns to 100%, i.e., the thermostat valve 55 returns to a fully open state. As a result, the total amount of the cooling water flows to the radiator 53.

As described above, in the first embodiment according to the present invention, the thermostat valve temperature TV can be temporarily decreased by the air conditioning apparatus 60 to temporarily decrease the thermostat valve opening degree VOD even when the temperature of cooling water passing through the cooling water supply pipe 51 is high. As a result, the cooling water can be supplied to the ion exchanger 58 of the radiator bypass pipe 54, and therefore, the conductivity of the cooling water can be prevented from excessively increasing.

Figure 5:
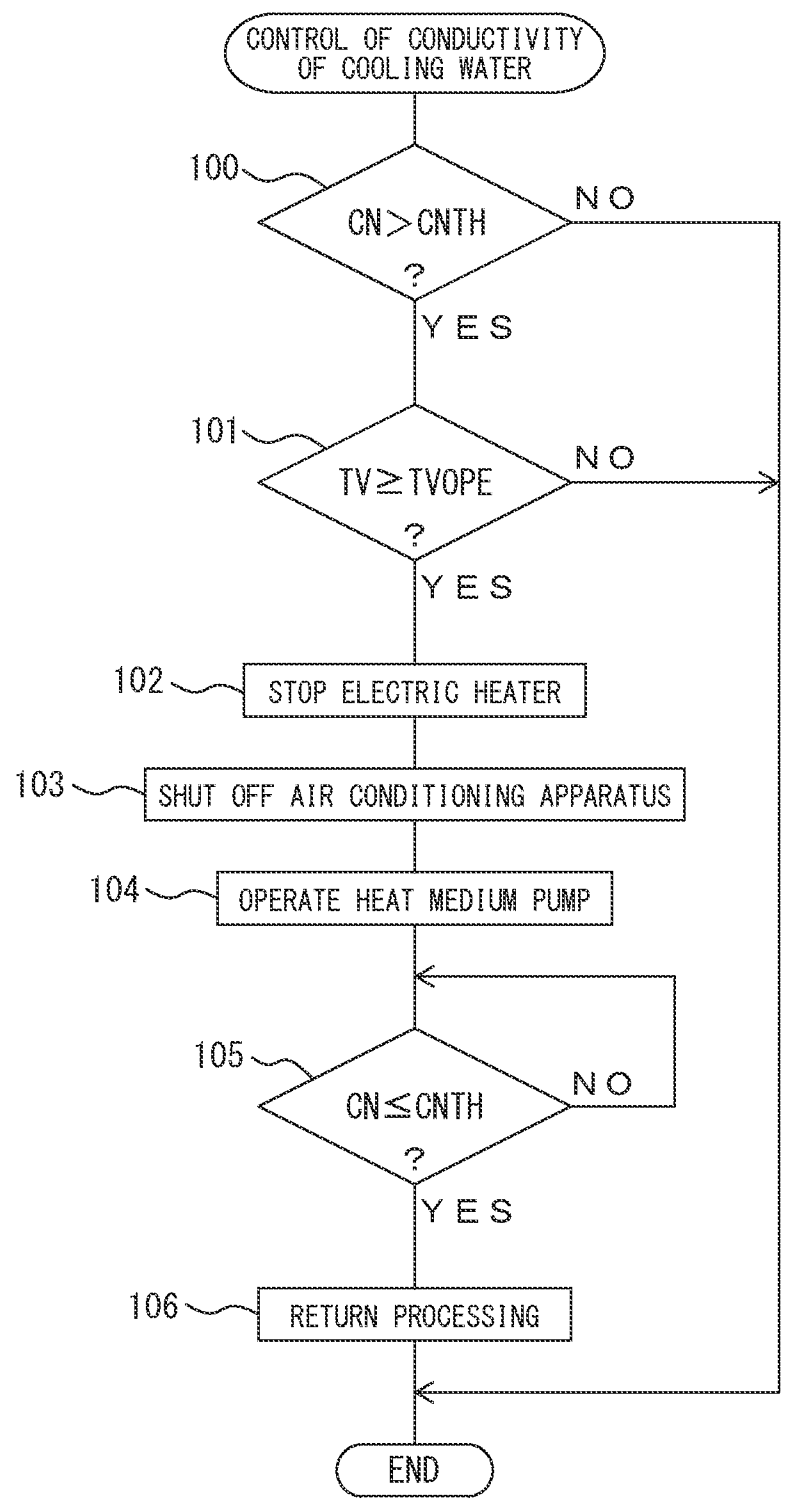
FIG. 5 is a flowchart representing the routine of the control of the conductivity of the cooling water in the first embodiment according to the present invention.

FIG. 5 represents the routine of the control of the conductivity of the cooling water in the first embodiment according to the present invention. The routine is executed by interruptions at regular time intervals.

With reference to FIG. 5, it is determined in step 100 whether or not the conductivity CN of cooling water is higher than the threshold value CNTH. The process goes to step 101 when CN>CNTH is satisfied, and the process is ended when CN≤CNTH is satisfied. In step 101, it is determined whether or not the thermostat valve temperature TV is the valve opening end temperature TVOPE at the end of opening the valve, or more. The process goes to step 102 when TV≥TVOPE is satisfied, and the process is ended when TV<TVOPE is satisfied. In step 102, the electric heater 63 is switched to or maintained in a stopping state. In subsequent step 103, the air conditioning apparatus 60 and the cooling water supply pipe 51 are switched to or maintained in a shut-off state. In subsequent step 104, the heat medium pump 62 is switched to or maintained in an operating state. In subsequent step 105, it is determined whether or not the conductivity CN of the cooling water is the threshold value CNTH or less. The process goes to step 106 when CN≤CNTH is satisfied, and the process returns to step 105 when CN>CNTH is satisfied. The above-described return processing is carried out in step 106.

Next, a second embodiment according to the present invention will be described. Its differences from the first embodiment according to the present invention will be described below.

In the above-described first embodiment according to the present invention, the thermostat valve temperature TV is controlled by the air conditioning apparatus 60 so that the thermostat valve opening degree VOD is 0%, i.e., so that the thermostat valve 55 is fully closed. In this case, there is a fear that the temperature of cooling water excessively increases because the cooling water is temporarily prevented from being supplied to the radiator 53.

Thus, in the second embodiment according to the present invention, when it is needed to control a thermostat valve opening degree VOD by the air conditioning apparatus 60, a thermostat valve temperature TV is controlled so that the thermostat valve opening degree VOD is an intermediate opening degree, i.e., an opening degree of more than 0% and less than 100%. As a result, a portion of cooling water continuously flows into the radiator 53. Therefore, the conductivity of the cooling water is prevented from excessively increasing while preventing the temperature of the cooling water from excessively increasing.

Variations in the thermostat valve opening degree VOD will be described with reference to FIG. 6. Once the thermostat valve opening degree VOD becomes 100, the thermostat valve opening degree VOD varies along the continuous line A of FIG. 6 until the thermostat valve opening degree VOD becomes 0%. In other words, when the thermostat valve temperature TV is higher than a valve closing end temperature TVCLE at the end of closing the valve, the thermostat valve opening degree VOD is maintained at 100% even in a case in which the thermostat valve temperature TV increases or decreases. When the thermostat valve temperature TV is lower than the valve closing end temperature TVCLE at the end of closing the valve and higher than the valve closing end temperature TVCLE at the end of closing the valve, the thermostat valve opening degree VOD is decreased with decreasing the thermostat valve temperature TV. In contrast, once the thermostat valve opening degree VOD becomes 0%, the thermostat valve opening degree VOD varies along the continuous line B of FIG. 6 until the thermostat valve opening degree VOD becomes 100%. In other words, when the thermostat valve temperature TV is lower than a valve opening start temperature TVOPS at the start of opening the valve, the thermostat valve opening degree VOD is maintained at 0% even in a case in which the thermostat valve temperature TV increases or decreases. When the thermostat valve temperature TV is higher than the valve opening start temperature TVOPS at the start of opening the valve and lower than a valve opening end temperature TVOPE at the end of opening the valve, the thermostat valve opening degree VOD is increased with increasing the thermostat valve temperature TV.

Then, the history of the thermostat valve temperature TV reveals whether the thermostat valve opening degree VOD varies along the continuous line A or the continuous line B, and further makes it possible to estimate a current thermostat valve opening degree VOD based on the continuous line A or the continuous line B, and on the thermostat valve temperature TV. The relationship between the thermostat valve opening degree VOD and the thermostat valve temperature TV represented in FIG. 6 is stored in the ROM 62 in the form of a map in advance.

The second embodiment according to the present invention will be further described with reference to FIG. 7. In FIG. 7, X indicates a state in which the thermostat valve temperature TV is higher than the valve opening end temperature TVOPE at the end of opening the valve, i.e., the thermostat valve opening degree VOD is 100%. In the state, the conductivity CN of cooling water gradually increases. When the conductivity CN becomes higher than a preset threshold value CNTH at time t11, the control of the thermostat valve opening degree VOD by the air conditioning apparatus 60 is started in a manner similar to that of the first embodiment. However, in the second embodiment, the thermostat valve opening degree VOD is estimated using the map of FIG. 6, the thermostat valve temperature TV is controlled so that the thermostat valve opening degree VOD is maintained at a target opening degree VODT (for example, ranging from 40% to 60%), and therefore, the rotation number RP of the heat medium pump 62, i.e., the amount of a heat medium discharged from the heat medium pump 62 is controlled. Then, when the thermostat valve temperature TV reaches the valve closing start temperature TVCLS at the start of closing the valve at time t12, the thermostat valve opening degree VOD starts to decrease. Thus, a portion of cooling water starts to flow to the radiator bypass pipe 54. As a result, the conductivity CN of the cooling water starts to decrease. In this case, the remaining cooling water continues flowing into the radiator 53. Therefore, the temperature of the cooling water is prevented from excessively increasing. Then, when the conductivity CN of the cooling water becomes the threshold value CNTH or less at time t13, the control of the thermostat valve opening degree VOD by the air conditioning apparatus 60 is ended, and return processing is carried out. Then, when the thermostat valve temperature TV reaches the valve closing start temperature TVCLS at time t14, the thermostat valve opening degree VOD returns to 100%.

Figure 8:
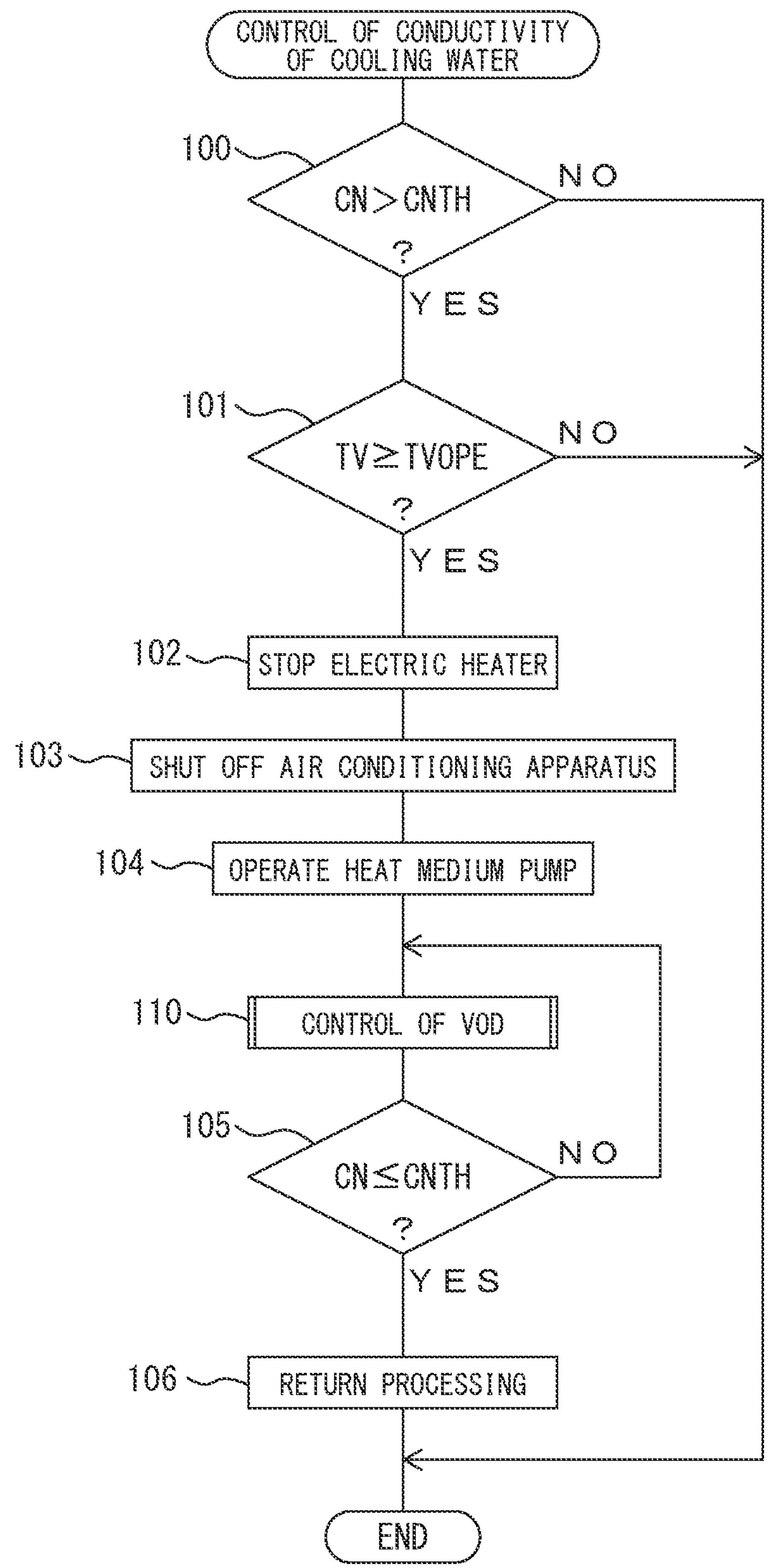
FIG. 8 is a flowchart representing the routine of the control of the conductivity of the cooling water in the second embodiment according to the present invention.
Figure 9:
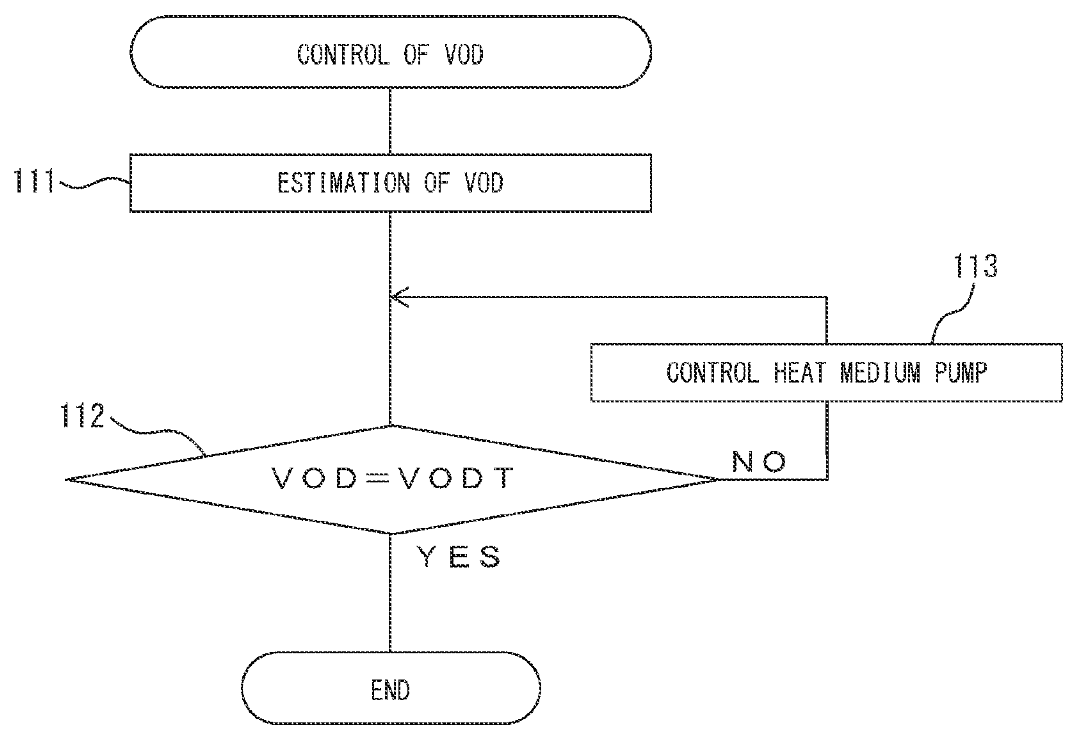
FIG. 9 is a flowchart representing the routine of the control of a thermostat valve opening degree VOD.

FIG. 8 represents the routine of the control of the conductivity of the cooling water in the second embodiment according to the present invention. The routine differs from the routine represented in FIG. 5 in the following points. In other words, the process goes from step 104 to step 110, and the routine of the control of the thermostat valve opening degree VOD is executed. The routine is represented in FIG. 9. In subsequent step 105, it is determined whether or not the conductivity CN of the cooling water is the threshold value CNTH or less. The process goes to step 106 when CN≤CNTH is satisfied, and the process returns to step 110 when CN>CNTH is satisfied.

FIG. 9 represents the routine of the control of the thermostat valve opening degree VOD.

Figure 6:
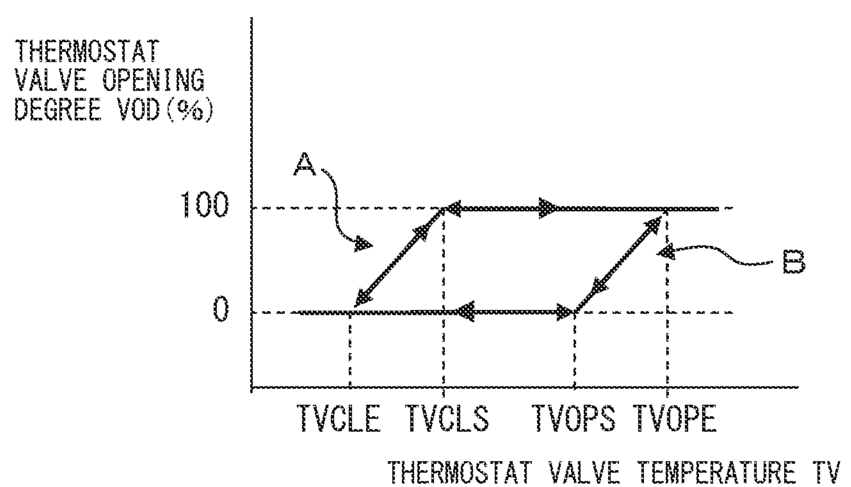
FIG. 6 is a graph representing a relationship between a thermostat valve opening degree and a thermostat valve temperature.
Figure 7:
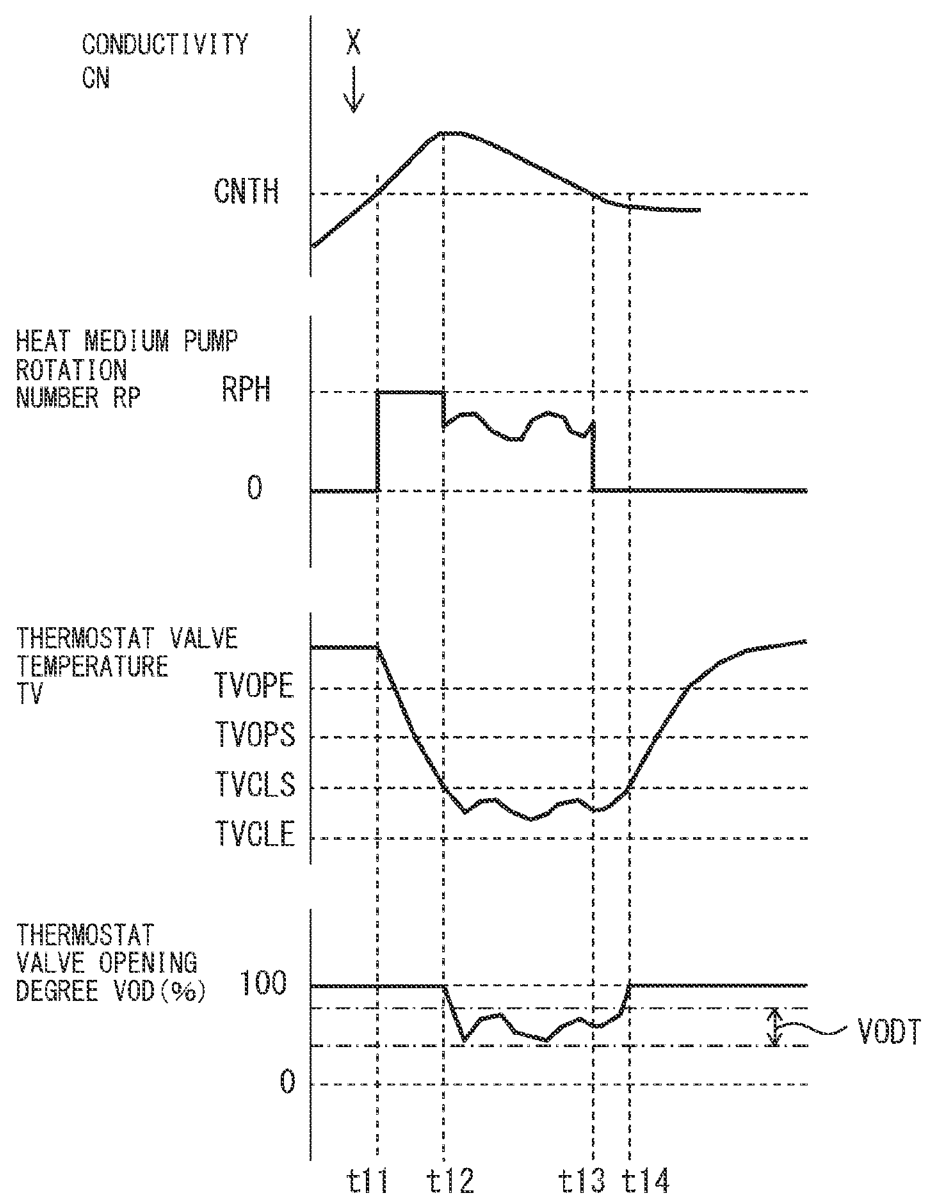
FIG. 7 is a timing chart for explaining the control of the conductivity of cooling water in a second embodiment according to the present invention.

With reference to FIG. 9, a current thermostat valve opening degree VOD is estimated based on the thermostat valve temperature TV referring to the map of FIG. 6 in step 111. In subsequent step 112, it is determined whether or not the current thermostat valve opening degree VOD is the target opening degree VODT. When the current thermostat valve opening degree VOD is the target opening degree VODT, the process is ended. When the current thermostat valve opening degree VOD is not the target opening degree VODT, the process goes to step 113. In step 113, the rotation number PR of the heat medium pump 62 is controlled so that the thermostat valve opening degree VOD becomes the target opening degree VODT. Specifically, when the current thermostat valve opening degree VOD is more than the target opening degree VODT, the rotation number of the heat medium pump 62 is increased, and the amount of a heat medium sent to the housing 56 is increased. In contrast, when the current thermostat valve opening degree VOD is less than the target opening degree VODT, the rotation number of the heat medium pump 62 is decreased, and the amount of the heat medium sent to the housing 56 is decreased.

Next, a third embodiment according to the present invention will be described. Its differences from the first embodiment according to the present invention will be described below.

In the above-described first embodiment according to the present invention, when the thermostat valve temperature TV is higher than the valve opening end temperature TVOPE at the end of opening the valve, i.e., the thermostat valve opening degree VOD is 100%, the thermostat valve opening degree VOD is temporarily allowed to be 0% by the air conditioning apparatus 60, thereby sending cooling water to the radiator bypass pipe 54 or the ion exchanger 58. Conversely, the control of the thermostat valve opening degree VOD by the air conditioning apparatus 60 is not started when the thermostat valve opening degree VOD is less than 100%, i.e., a portion of the cooling water is sent to the radiator bypass pipe 54 or the ion exchanger 58. However, the conductivity CN of the cooling water may exceed the threshold value CNTH even when a portion of the cooling water is sent to the radiator bypass pipe 54 or the ion exchanger 58.

Thus, in the third embodiment according to the present invention, a current thermostat valve opening degree VOD is estimated, and the thermostat valve opening degree VOD is temporarily allowed to be 0% by the air conditioning apparatus 60 when the current thermostat valve opening degree VOD is more than an opening degree VODU set at less than 100%. As a result, the control of the thermostat valve opening degree VOD by the air conditioning apparatus 60 is carried out even when a portion of the cooling water is sent to the radiator bypass pipe 54 or the ion exchanger 58.

Figure 10:
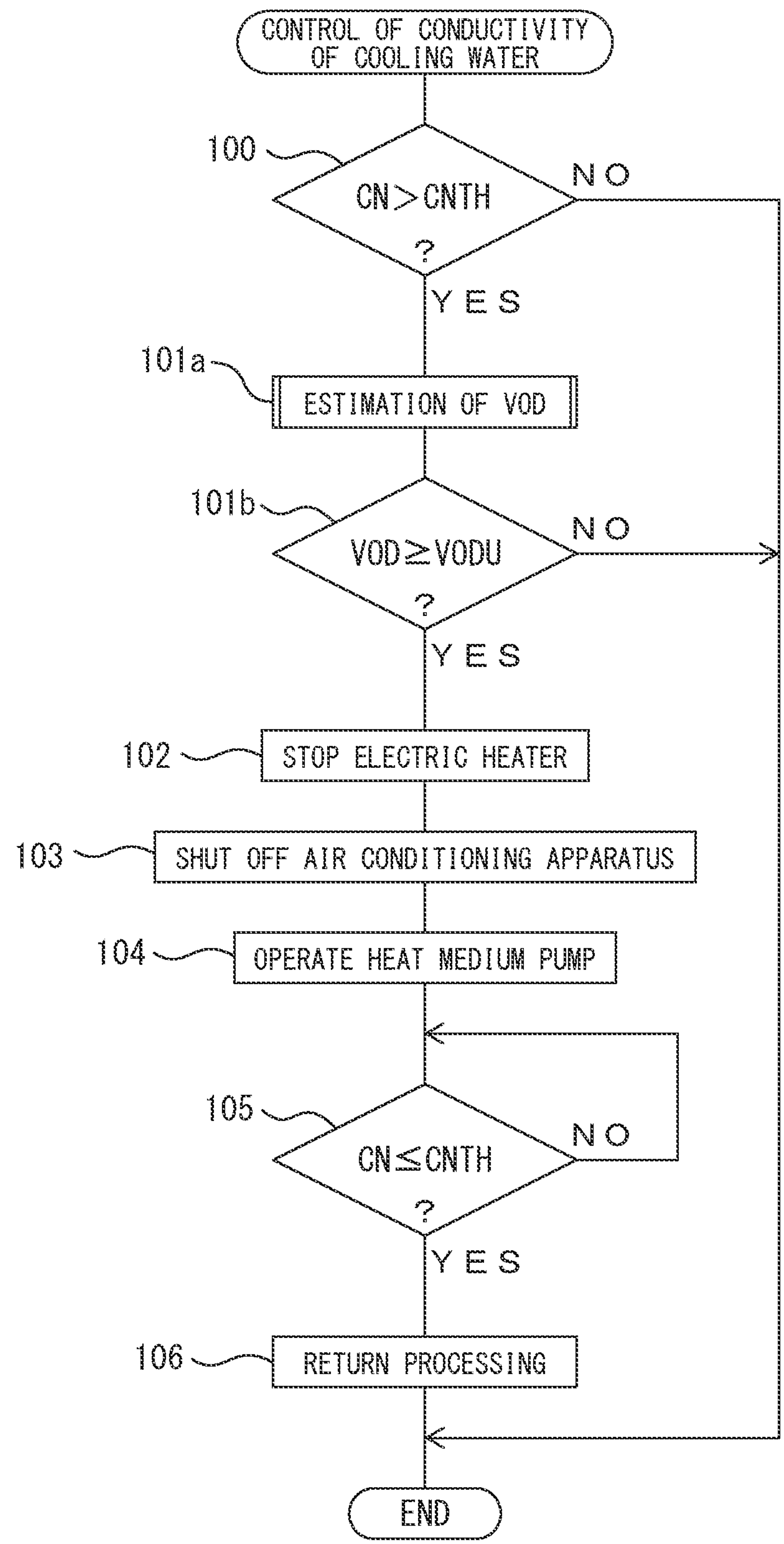
FIG. 10 is a flowchart representing the routine of the control of the conductivity of cooling water in a third embodiment according to the present invention.

FIG. 10 represents the routine of the control of the conductivity of the cooling water in the third embodiment according to the present invention. The routine differs from the routine represented in FIG. 5 in the following points. In other words, the process goes to step 101*a* when CN>CNTH is satisfied in step 100. In step 101*a*, a current thermostat valve opening degree VOD is estimated using the map representing the relationship of FIG. 6. Then, the process goes to step 101*b*, and it is determined whether or not the current thermostat valve opening degree VOD is the preset opening degree VODU or more. The process goes to step 102 when VOD≥VODU is satisfied, and the process is ended when VOD<VODU is satisfied.

Next, a fourth embodiment according to the present invention will be described. Its differences from the third embodiment according to the present invention will be described below.

In the fourth embodiment according to the present invention, a thermostat valve temperature TV is controlled so that a thermostat valve opening degree VOD becomes a target opening degree VODT which is an intermediate opening degree, when it is needed to control the thermostat valve opening degree VOD by the air conditioning apparatus 60, in a manner similar to that of the second embodiment according to the present invention. As a result, in the fourth embodiment, the conductivity of cooling water is also prevented from excessively increasing while preventing the temperature of the cooling water from excessively increasing.

Figure 11:
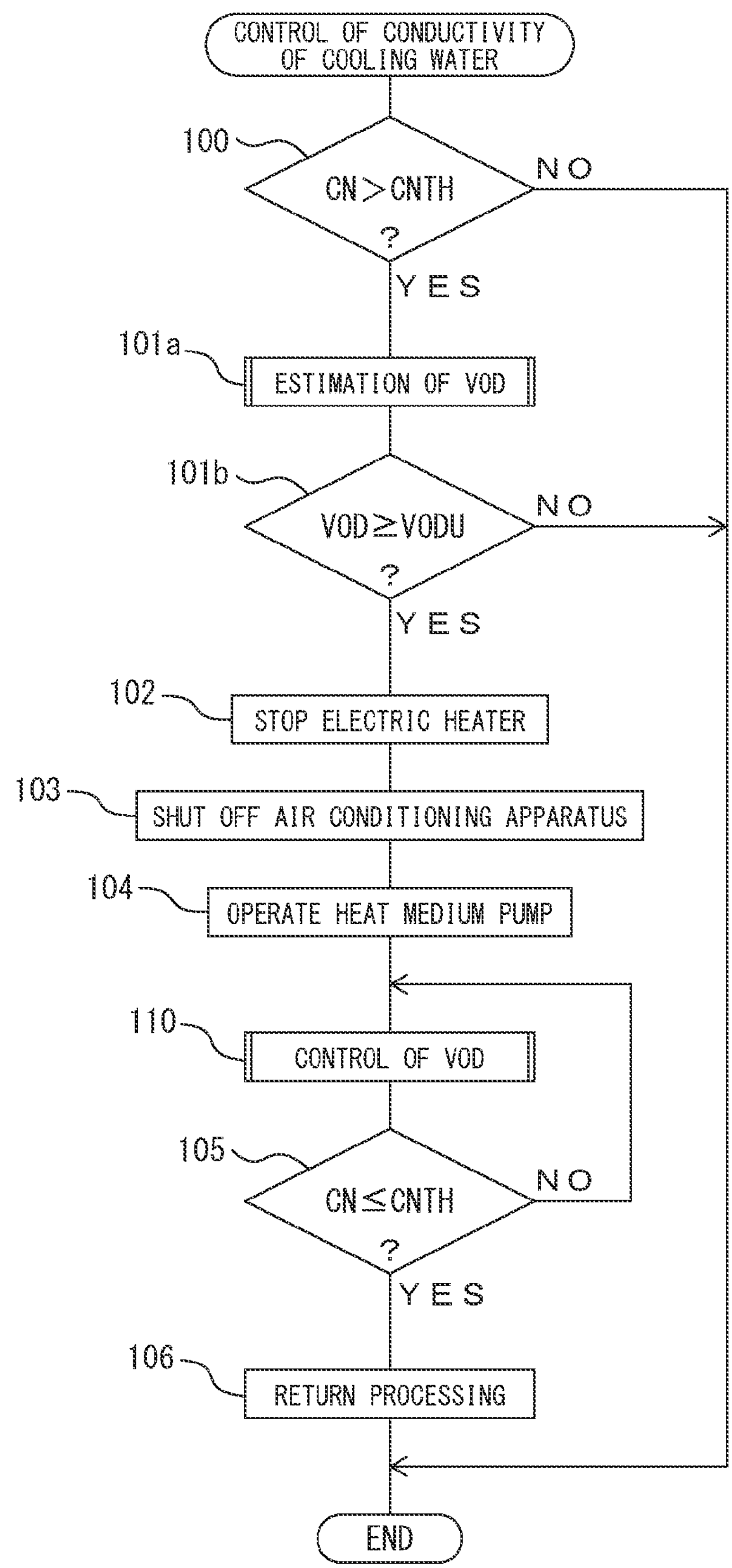
FIG. 11 is a flowchart representing the routine of the control of the conductivity of cooling water in a fourth embodiment according to the present invention.

FIG. 11 represents the routine of the control of the conductivity of the cooling water in the fourth embodiment according to the present invention. The routine differs from the routine represented in FIG. 10 in the following points. In other words, the process goes from step 104 to step 110, and the routine of the control of the thermostat valve opening degree VOD is executed. The routine is represented in FIG. 9. In subsequent step 105, it is determined whether or not the conductivity CN of the cooling water is a threshold value CNTH or less. The process goes to step 106 when CN≤CNTH is satisfied, and the process returns to step 110 when CN>CNTH is satisfied.

Next, a fifth embodiment according to the present invention will be described. Its differences from the first embodiment according to the present invention will be described below.

For example, during stopping of the fuel cell system A, the cooling water pump 52 is stopped, and therefore, the flow of cooling water in the cooling water supply pipe 51, the radiator 53, and the radiator bypass pipe 54 is stopped. During such stopping of the fuel cell system A, ions may be eluted from the radiator 53 into the cooling water, thereby increasing the conductivity of the cooling water. However, when the fuel cell system A is then restarted, a total amount of the cooling water is sent into the radiator bypass pipe 54 in a case in which a thermostat valve temperature TV is lower than a valve closing start temperature TVCLE at the end of closing the valve, and therefore, a thermostat valve opening degree VOD is 0%. In other words, no cooling water flows into the radiator 53, and therefore, cooling water having high conductivity continues staying around the radiator 53. Then, when the thermostat valve temperature TV reaches a valve opening start temperature TVOPS at the start of opening the valve by increasing the temperature of the cooling water, and a portion of the cooling water is sent to the radiator 53, there is a fear that cooling water having high conductivity flows into the cooling water supply pipe 51 with a rush.

Thus, in the fifth embodiment according to the present invention, when the thermostat valve opening degree VOD is 0% and the conductivity of cooling water around the radiator 53 is higher than a threshold value, the thermostat valve temperature TV is temporarily increased by the air conditioning apparatus 60 to temporarily increase the thermostat valve opening degree VOD, thereby allowing the cooling water to flow in the radiator 53. This will be described with reference to FIG. 12.

Figure 12:
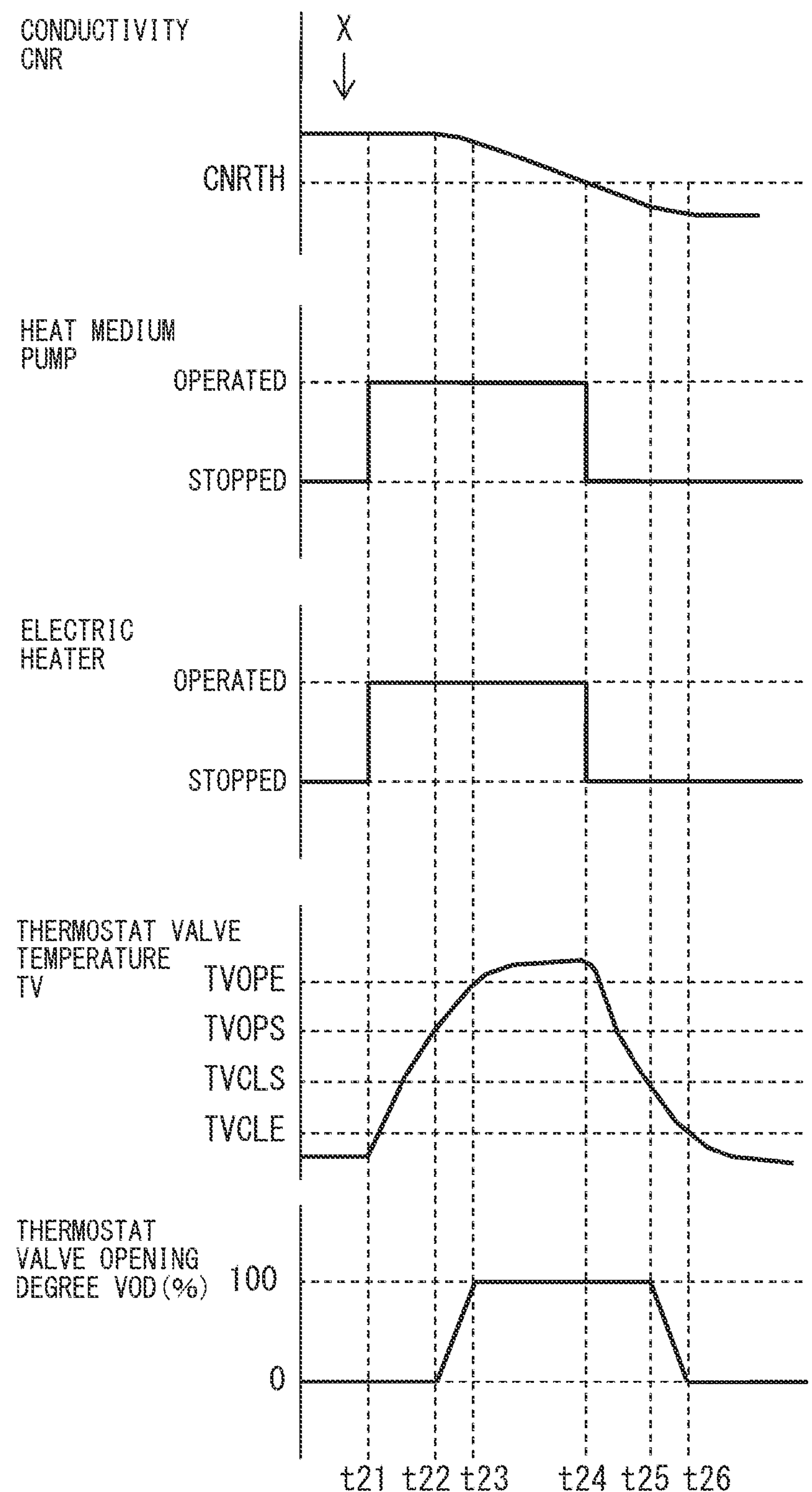
FIG. 12 is a timing chart representing a method for decreasing the conductivity of cooling water in a fifth embodiment according to the present invention.

In FIG. 12, X indicates a state in which the thermostat valve temperature TV is lower than a valve closing start temperature TVCLS at the start of closing the valve, i.e., the thermostat valve opening degree VOD is 0%, and the conductivity CNR of cooling water around the radiator 53, detected by the conductivity sensor 75, is higher than a preset threshold value CNRTH. In the state, a total amount of the cooling water is supplied to the radiator bypass pipe 54, and the cooling water is not supplied to the radiator 53. When, at time t21, the operation of the fuel cell system A is started and the conductivity CNR is detected exceeding the threshold value CNRTH, the control of the thermostat valve opening degree VOD by the air conditioning apparatus 60 is started. In other words, the electric heater 63 of the air conditioning apparatus 60 is switched to or maintained in an operating state. Further, the air conditioning apparatus 60 is switched to or maintained in the state of being shut off from the cooling water supply pipe 51. Furthermore, the heat medium pump 62 is switched to or maintained in an operating state. As a result, a heat medium having low temperature flows in the housing 56, and therefore, the thermostat valve temperature TV starts to increase. Then, when the thermostat valve temperature TV reaches the valve opening start temperature TVOPS at the start of opening the valve at time t22, the thermostat valve opening degree VOD starts to increase, i.e., the thermostat valve 55 starts to be opened. As a result, a portion of the cooling water starts to be supplied to the radiator 53. As a result, the cooling water flows to the radiator 53. Therefore, the conductivity CNR of the cooling water around the radiator 53 starts to decrease. Then, when the thermostat valve temperature TV reaches a valve opening end temperature TVOPE at the end of opening the valve at time t23, the thermostat valve opening degree VOD becomes 100%. As a result, the total amount of the cooling water is supplied to the radiator 53. As a result, the conductivity CNR of the cooling water around the radiator 53 further decreases. Then, when the conductivity CNR of the cooling water around the radiator 53 becomes the threshold value CNRTH or less at time t24, the control of the thermostat valve opening degree VOD by the air conditioning apparatus 60 is ended, and return processing is carried out. In other words, the electric heater 63 is returned to a stopping state, or is maintained in the operating state. Further, the air conditioning apparatus 60 is returned to the state of being connected to the cooling water supply pipe 51, or is maintained in the state of being shut off from the cooling water supply pipe 51. Furthermore, the heat medium pump 62 is returned to a stopping state, or is maintained in the operating state. As a result, the thermostat valve temperature TV is gradually decreased by cooling water flowing in the thermostat valve 55. Then, when the thermostat valve temperature TV reaches the valve closing start temperature TVCLS at the start of closing the valve at time t25, the thermostat valve opening degree VOD starts to decrease. As a result, a portion of the cooling water starts to flow to the radiator bypass pipe 54 or the ion exchanger 58. Then, when the thermostat valve temperature TV reaches the valve closing end temperature TVCLE at time t26, the thermostat valve opening degree VOD becomes 0%. As a result, the total amount of the cooling water flows to the radiator bypass pipe 54. The cooling water having high conductivity flowing from the radiator 53 is then sent to the ion exchanger 58, and therefore, the conductivity of the cooling water is decreased.

As described above, in the fifth embodiment according to the present invention, the thermostat valve temperature TV can be temporarily increased by the air conditioning apparatus 60 to temporarily increase the thermostat valve opening degree VOD even when the temperature of cooling water passing through the cooling water supply pipe 51 is low. As a result, the cooling water is supplied to the radiator 53, and therefore, the conductivity CNR of the cooling water around the radiator 53 is prevented from being maintained at a high level.

Figure 13:
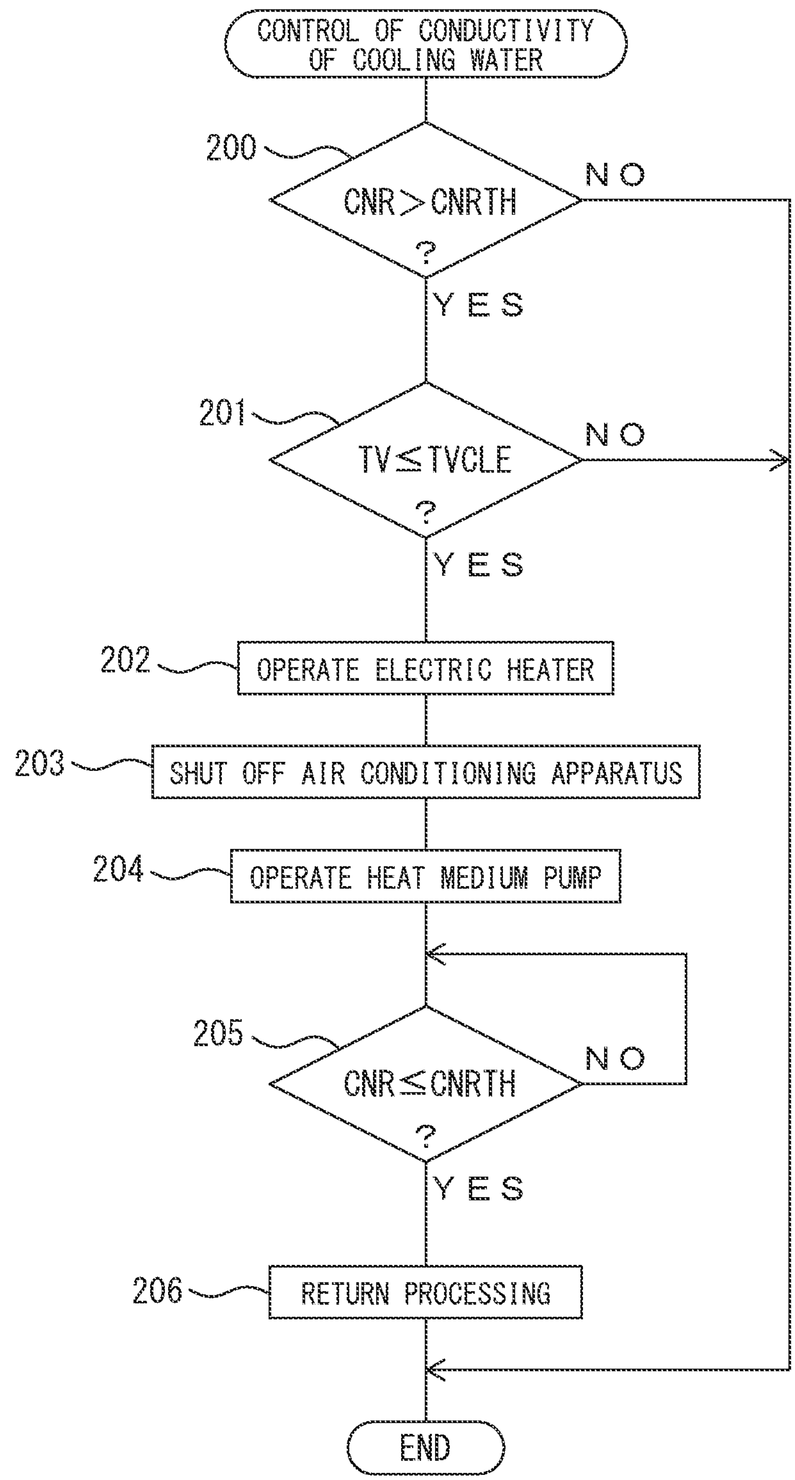
FIG. 13 is a flowchart representing the routine of the control of the conductivity of the cooling water in the fifth embodiment according to the present invention.

FIG. 13 represents the routine of the control of the conductivity of the cooling water in the fifth embodiment according to the present invention. The routine is executed by interruptions at regular time intervals.

With reference to FIG. 13, it is determined in step 200 whether or not the conductivity CNR of the cooling water around the radiator 53 is higher than the threshold value CNRTH. The process goes to step 201 when CNR>CNRTH is satisfied, and the process is ended when CNR≤CNRTH is satisfied. In step 201, it is determined whether or not the thermostat valve temperature TV is the valve closing end temperature TVCLE at the end of closing the valve, or less. The process goes to step 202 when TV≤TVCLE is satisfied, and the process is ended when TV>TVCLE is satisfied. In step 202, the electric heater 63 is switched to or maintained in an operating state. In subsequent step 203, the air conditioning apparatus 60 and the cooling water supply pipe 51 are switched to or maintained in a shut-off state. In subsequent step 204, the heat medium pump 62 is switched to or maintained in an operating state. In subsequent step 205, it is determined whether or not the conductivity CNR of the cooling water around the radiator 53 is the threshold value CNRTH or less. The process goes to step 206 when CNR≤CNRTH is satisfied, and the process returns to step 205 when CNR>CNRTH is satisfied. The above-described return processing is carried out in step 206.

Next, a sixth embodiment according to the present invention will be described. Its differences from the fifth embodiment according to the present invention will be described below.

In the fifth embodiment according to the present invention, the thermostat valve temperature TV is controlled by the air conditioning apparatus 60 so that the thermostat valve opening degree is 100%, i.e., so that the thermostat valve 55 is fully opened. In this case, it is impossible to decrease the conductivity of the whole cooling water flowing in the cooling water supply pipe 51 while the thermostat valve 55 is fully open because the cooling water is prevented from being supplied to the radiator bypass pipe 54 or the ion exchanger 58. In other words, there is a fear that the conductivity of the whole cooling water is maintained at a high level.

Thus, in the sixth embodiment according to the present invention, when it is needed to control a thermostat valve opening degree VOD by the air conditioning apparatus 60, a thermostat valve temperature TV is controlled so that the thermostat valve opening degree VOD is an intermediate opening degree. As a result, the conductivity of the whole cooling water is immediately decreased.

Figure 14:
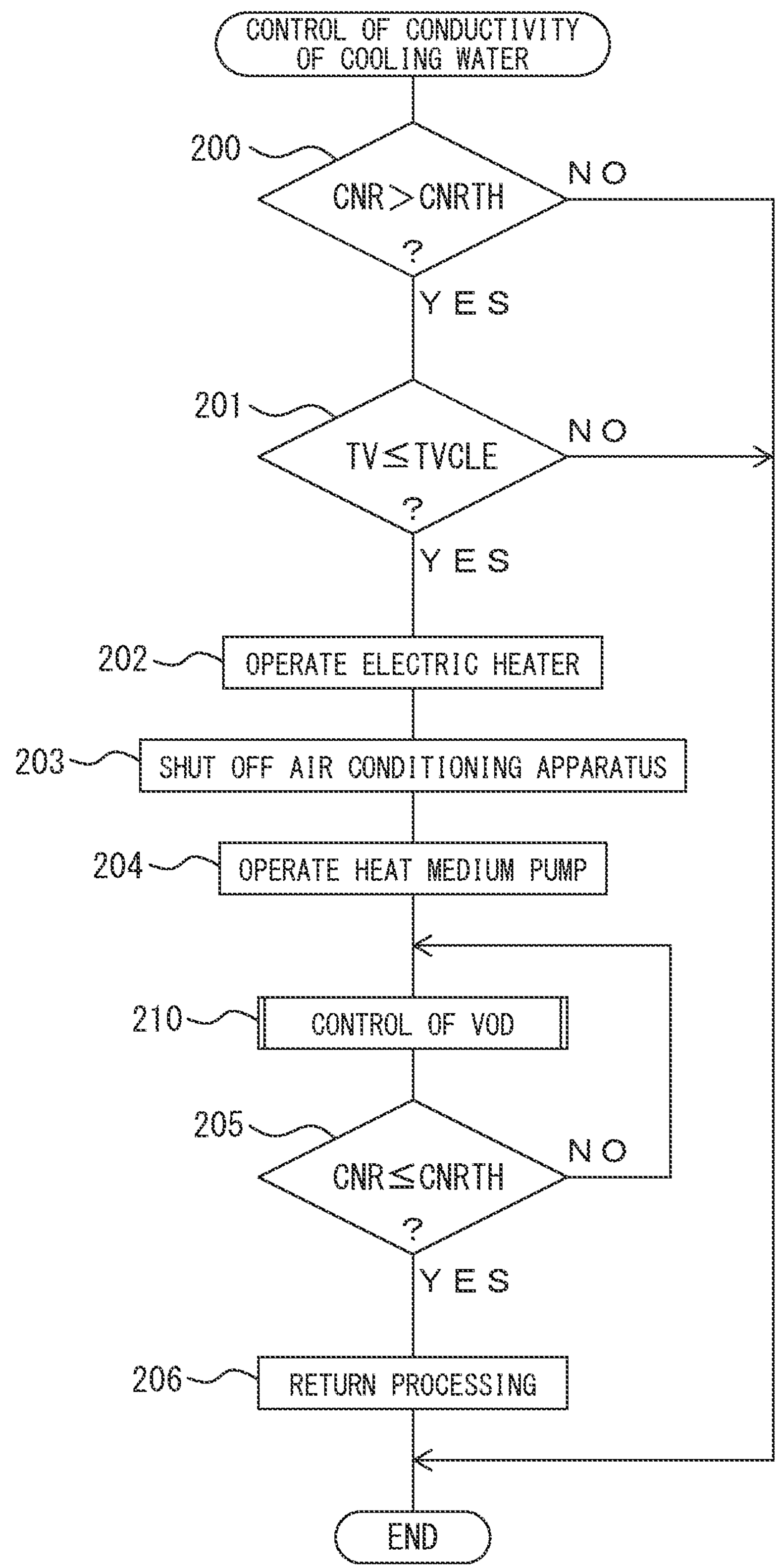
FIG. 14 is a flowchart representing the routine of the control of the conductivity of cooling water in a sixth embodiment according to the present invention.

FIG. 14 represents the routine of the control of the conductivity of the cooling water in the sixth embodiment according to the present invention. The routine differs from the routine represented in FIG. 13 in the following points. In other words, the process goes from step 204 to step 210, and the routine of the control of the thermostat valve opening degree VOD is executed. The routine is represented in FIG. 9. In subsequent step 205, it is determined whether or not the conductivity CNR of cooling water around the radiator 53 is a threshold value CNRTH or less. The process goes to step 206 when CNR≤CNRTH is satisfied, and the process returns to step 210 when CNR>CNRTH is satisfied.

Next, a seventh embodiment according to the present invention will be described. Its differences from the fifth embodiment according to the present invention will be described below.

In the above-described fifth embodiment according to the present invention, when the thermostat valve temperature TV is lower than the valve closing end temperature TVCLE at the end of closing the valve, i.e., the thermostat valve opening degree VOD is 0%, the thermostat valve opening degree VOD is temporarily allowed to be 100% by the air conditioning apparatus 60, thereby sending cooling water to the radiator 53. Conversely, the control of the thermostat valve opening degree VOD by the air conditioning apparatus 60 is not started when the thermostat valve opening degree VOD is less than 100%, i.e., a portion of the cooling water is sent to the radiator 53. However, the conductivity CNR of cooling water around the radiator 53 may exceed the threshold value CNRTH even when a portion of the cooling water is sent to the radiator 53.

Thus, in the seventh embodiment according to the present invention, a current thermostat valve opening degree VOD is estimated, and the thermostat valve opening degree VOD is temporarily allowed to be 100% by the air conditioning apparatus 60 when the current thermostat valve opening degree VOD is less than an opening degree VODL set at more than 0%. As a result, the control of the thermostat valve opening degree VOD by the air conditioning apparatus 60 is carried out even when a portion of the cooling water is sent to the radiator 53.

Figure 15:
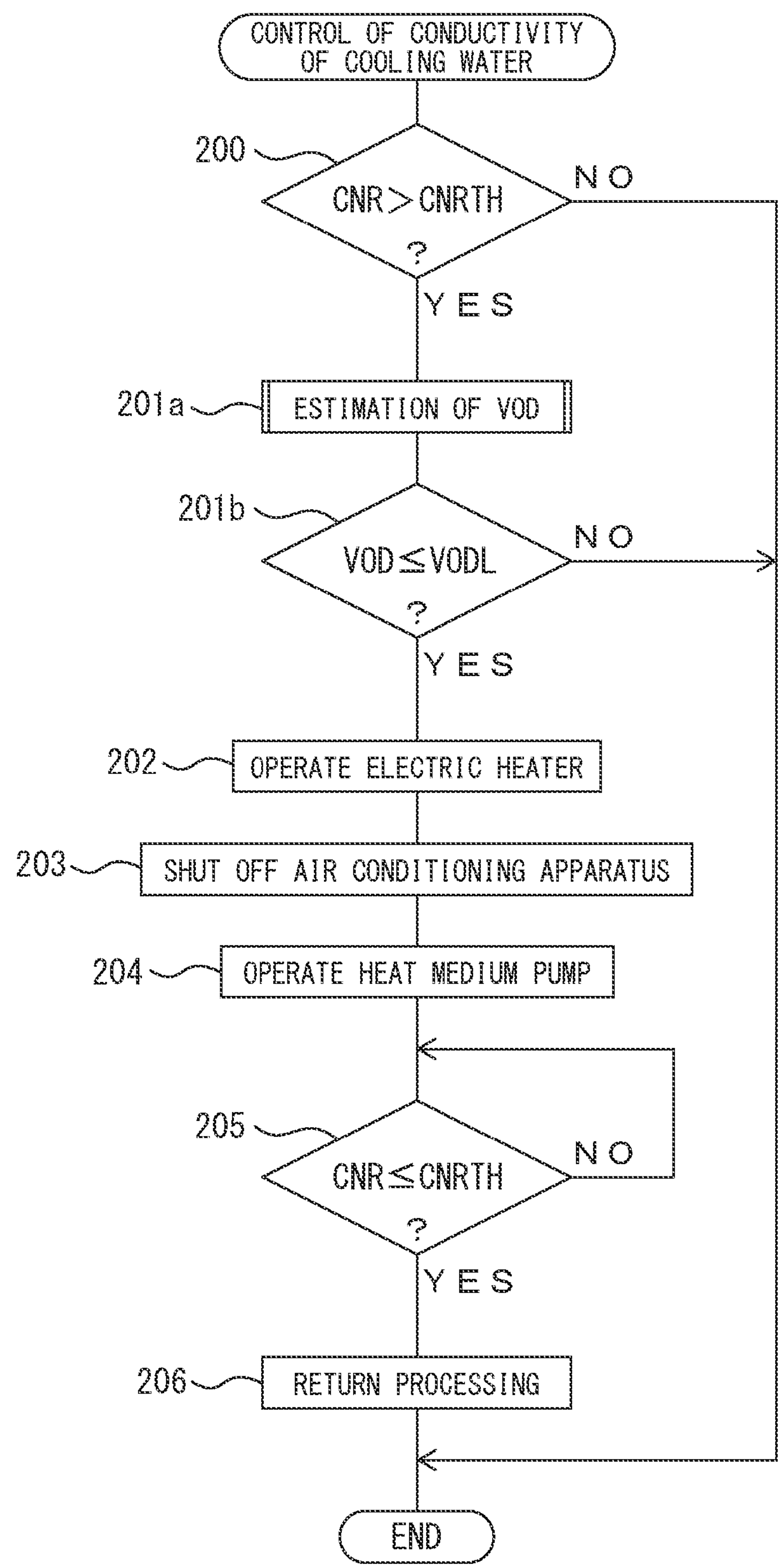
FIG. 15 is a flowchart representing the routine of the control of the conductivity of cooling water in a seventh embodiment according to the present invention.

FIG. 15 represents the routine of the control of the conductivity of the cooling water in the seventh embodiment according to the present invention. The routine differs from the routine represented in FIG. 13 in the following points. In other words, the process goes to step 201*a* when CNR>CNRTH is satisfied in step 200. In step 201*a*, a current thermostat valve opening degree VOD is estimated using the map representing the relationship of FIG. 6. Then, the process goes to step 201*b*, and it is determined whether or not the current thermostat valve opening degree VOD is a preset opening degree VODU or more. The process goes to step 202 when VOD≥VODU is satisfied, and the process is ended when VOD<VODU is satisfied.

Next, an eighth embodiment according to the present invention will be described. Its differences from the seventh embodiment according to the present invention will be described below.

In the eighth embodiment according to the present invention, a thermostat valve temperature TV is controlled so that a thermostat valve opening degree VOD becomes a target opening degree VODT which is an intermediate opening degree, when it is needed to control the thermostat valve opening degree VOD by the air conditioning apparatus 60, in a manner similar to that of the sixth embodiment according to the present invention. As a result, the conductivity of the whole cooling water is also immediately decreased in the eighth embodiment.

Figure 16:
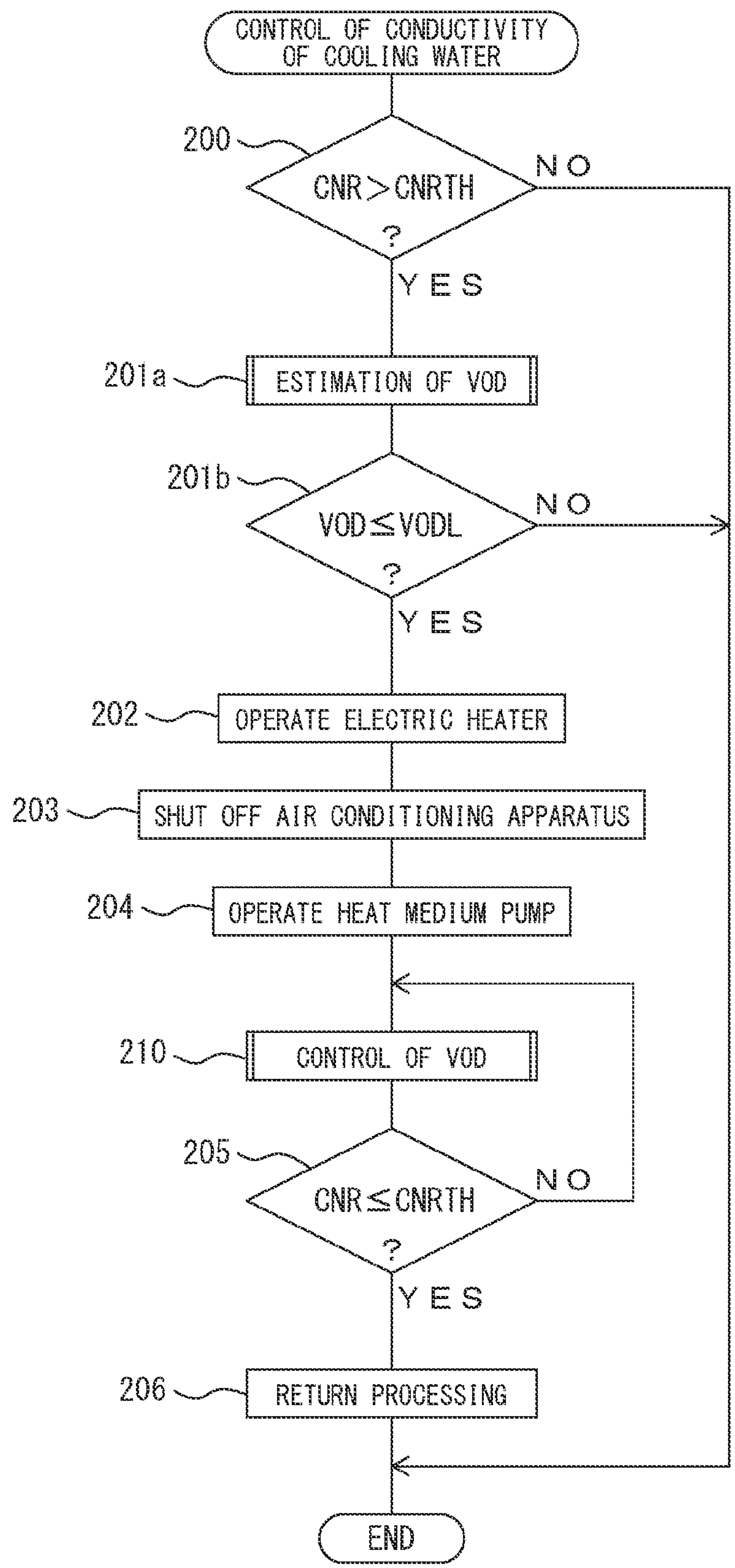
FIG. 16 is a flowchart representing the routine of the control of the conductivity of cooling water in an eighth embodiment according to the present invention.

FIG. 16 represents the routine of the control of the conductivity of the cooling water in the eighth embodiment according to the present invention. The routine differs from the routine represented in FIG. 15 in the following points. In other words, the process goes from step 204 to step 210, and the routine of the control of the thermostat valve opening degree VOD is executed. The routine is represented in FIG. 9. In subsequent step 205, it is determined whether or not the conductivity CNR of cooling water around the radiator 53 is a threshold value CNRTH or less. The process goes to step 206 when CNR≤CNRTH is satisfied, and the process returns to step 210 when CNR>CNRTH is satisfied.

Next, a ninth embodiment according to the present invention will be described. Its differences from the fifth embodiment according to the present invention will be described below.

In the fuel cell system A illustrated in FIG. 1, the cooling water pump 52 is operated when the fuel cell system A is started, and the cooling water pump 52 is continuously operated while the fuel cell system A is operated. As a result, cooling water continuously flows in the thermostat valve 55 while the fuel cell system A is operated.

In contrast, in the fifth embodiment according to the present invention, the thermostat valve temperature TV is increased by the air conditioning apparatus 60, thereby increasing the thermostat valve opening degree VOD. However, when the temperature of cooling water flowing in the thermostat valve 55 is considerably low, heat applied to the thermostat valve 55 by the heat medium is removed by the cooling water, and therefore, it is difficult to increase the thermostat valve temperature TV.

In contrast, for example, when external temperature is low, the fuel cell stack 10 can be cooled by external air, and therefore, the necessity to cool the fuel cell stack 10 by cooling water is low. For example, when the difference ΔTWD between the temperature of cooling water in the outlet of the cooling water passage 50 of the fuel cell stack 10 and the temperature of cooling water in the inlet of the cooling water passage 50 is small, the effect of cooling the fuel cell stack 10 by cooling water is low. In other words, the necessity to cool the fuel cell stack 10 by cooling water is low.

Thus, in the ninth embodiment according to the present invention, the amount of cooling water discharged from the cooling water pump 52 is temporarily decreased, thereby temporarily decreasing the amount of cooling water flowing in the thermostat valve 55, when it is judged that the necessity to cool the fuel cell stack 10 by cooling water is low in a case in which it is needed to increase a thermostat valve temperature TV by the air conditioning apparatus 60. As a result, the thermostat valve temperature TV can be immediately increased.

Specifically, when an external temperature TEX is a preset lower-limit external temperature TEXL (for example, 0° C.) or less and the above-described temperature difference ΔTWD is a preset lower-limit temperature difference ΔTWDL (for example, 7° C.) or less, it is judged that the necessity to cool the fuel cell stack 10 by cooling water is low; otherwise it is judged that the necessity to cool the fuel cell stack 10 by cooling water is high.

Figure 17:
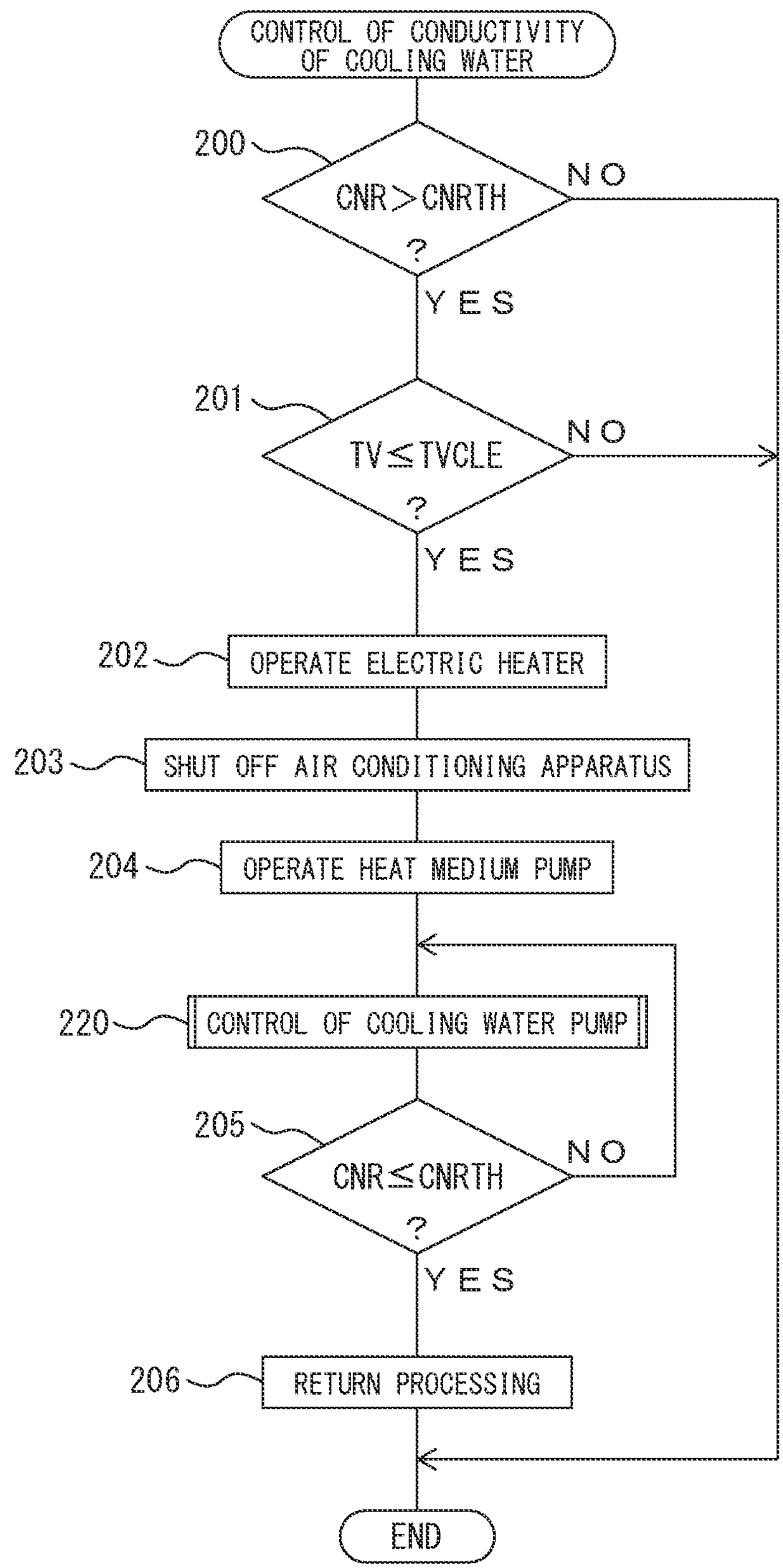
FIG. 17 is a flowchart representing the routine of the control of the conductivity of cooling water in a ninth embodiment according to the present invention.
Figure 18:
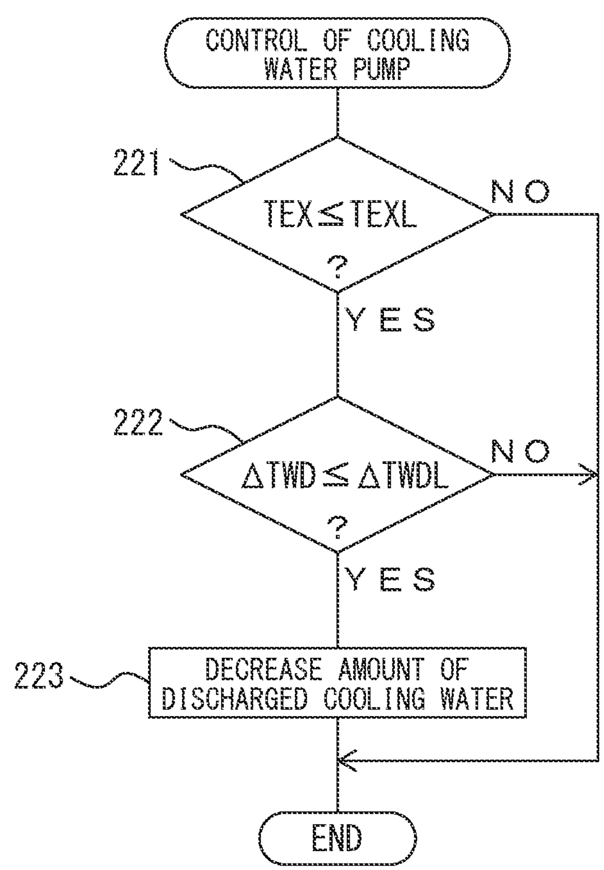
FIG. 18 is a flowchart representing the routine of the control of a cooling water pump.

FIG. 17 represents the routine of the control of the conductivity of the cooling water in the ninth embodiment according to the present invention. The routine differs from the routine represented in FIG. 13 in the following points. In other words, the process goes to step 220 following step 204, and the routine of the control of a cooling water pump is executed. The routine is represented in FIG. 18. Then, the process goes to step 205. In step 205, it is determined whether or not the conductivity CNR of cooling water around the radiator 53 is a threshold value CNRTH or less. The process goes to step 206 when CNR≤CNRTH is satisfied, and the process returns to step 220 when CNR>CNRTH is satisfied.

FIG. 18 represents the routine of the control of a cooling water pump.

With reference to FIG. 18, it is determined in step 221 whether or not the external temperature TEX is the preset lower-limit external temperature TEXL or less. The process goes to step 222 when TEX≤TEXL is satisfied. The process is ended when TEX>TEXL is satisfied. In step 222, it is determined whether or not the temperature difference ΔTWD is the lower-limit temperature difference ΔTWDL or less. The process goes to step 223 when ΔTWD≤ΔTWDL is satisfied. The process is ended when ΔTWD>ΔTWDL is satisfied. In step 223, the amount of cooling water discharged from the cooling water pump 52 is decreased to the low preset amount of cooling water. In another embodiment which is not illustrated, the amount of cooling water is decreased by a fixed amount.

Next, a tenth embodiment according to the present invention will be described. Its differences from the sixth embodiment according to the present invention will be described below.

In the tenth embodiment according to the present invention, the amount of cooling water discharged from the cooling water pump 52 is temporarily decreased, thereby temporarily decreasing the amount of cooling water flowing in the thermostat valve 55, when it is judged that the necessity to cool the fuel cell stack 10 by cooling water is low in a case in which it is needed to increase the thermostat valve temperature TV by the air conditioning apparatus 60 in the sixth embodiment according to the present invention, in a manner similar to that of the ninth embodiment according to the present invention. As a result, a thermostat valve temperature TV can be immediately increased.

Figure 19:
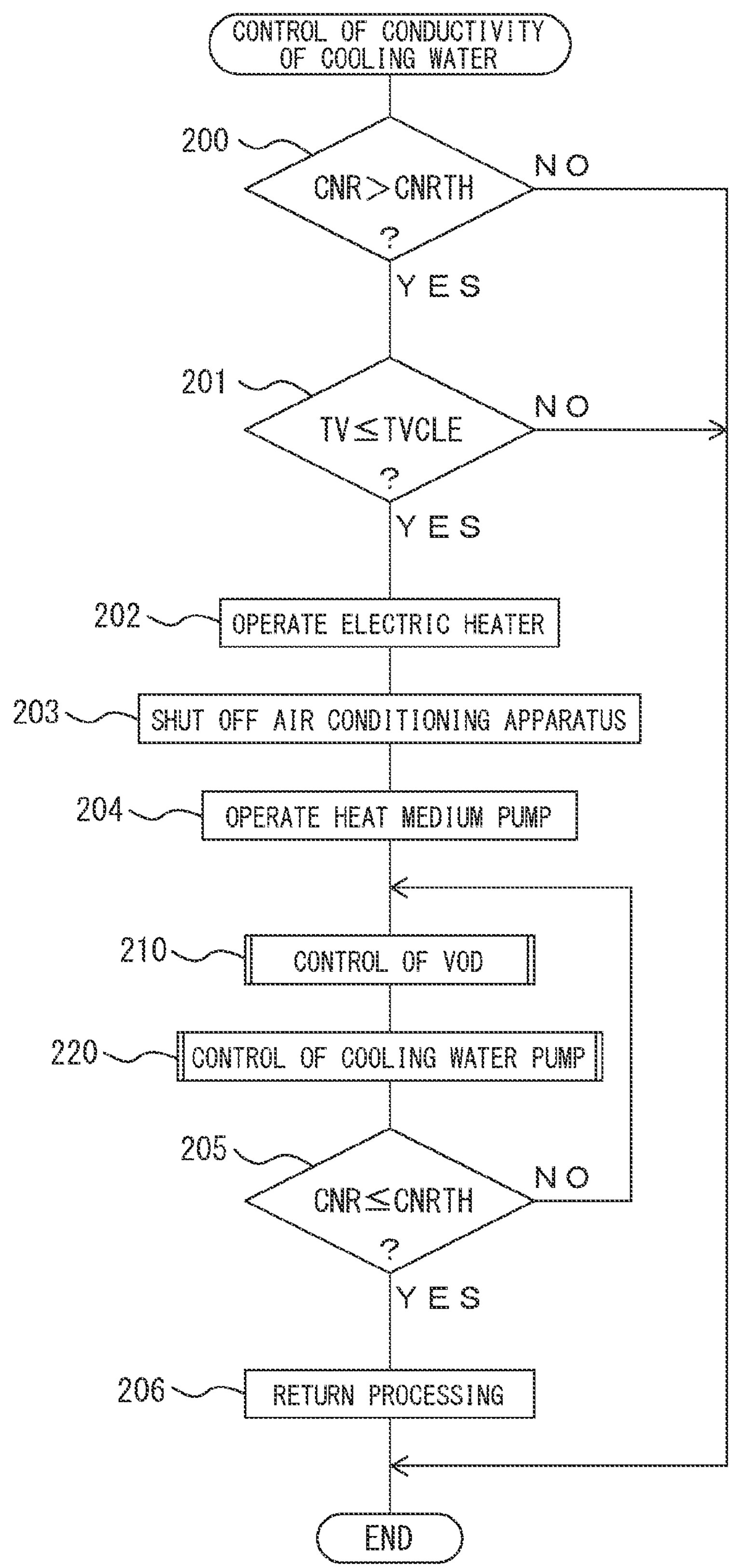
FIG. 19 is a flowchart representing the routine of the control of the conductivity of cooling water in a tenth embodiment according to the present invention.

FIG. 19 represents the routine of the control of the conductivity of the cooling water in the tenth embodiment according to the present invention. The routine differs from the routine represented in FIG. 14 in the following points. In other words, the process goes to step 220 following step 210, and the routine of the control of a cooling water pump represented in FIG. 18 is executed. Then, the process goes to step 205. In step 205, it is determined whether or not the conductivity CNR of cooling water around the radiator 53 is a threshold value CNRTH or less. The process goes to step 206 when CNR≤CNRTH is satisfied, and the process returns to step 210 when CNR>CNRTH is satisfied.

Next, an eleventh embodiment according to the present invention will be described. Its differences from the seventh embodiment according to the present invention will be described below.

In the eleventh embodiment according to the present invention, the amount of cooling water discharged from the cooling water pump 52 is temporarily decreased, thereby temporarily decreasing the amount of cooling water flowing in the thermostat valve 55, when it is judged that the necessity to cool the fuel cell stack 10 by cooling water is low in a case in which it is needed to increase the thermostat valve temperature TV by the air conditioning apparatus 60 in the seventh embodiment according to the present invention, in a manner similar to that of the ninth embodiment according to the present invention. As a result, a thermostat valve temperature TV can be immediately increased.

Figure 20:
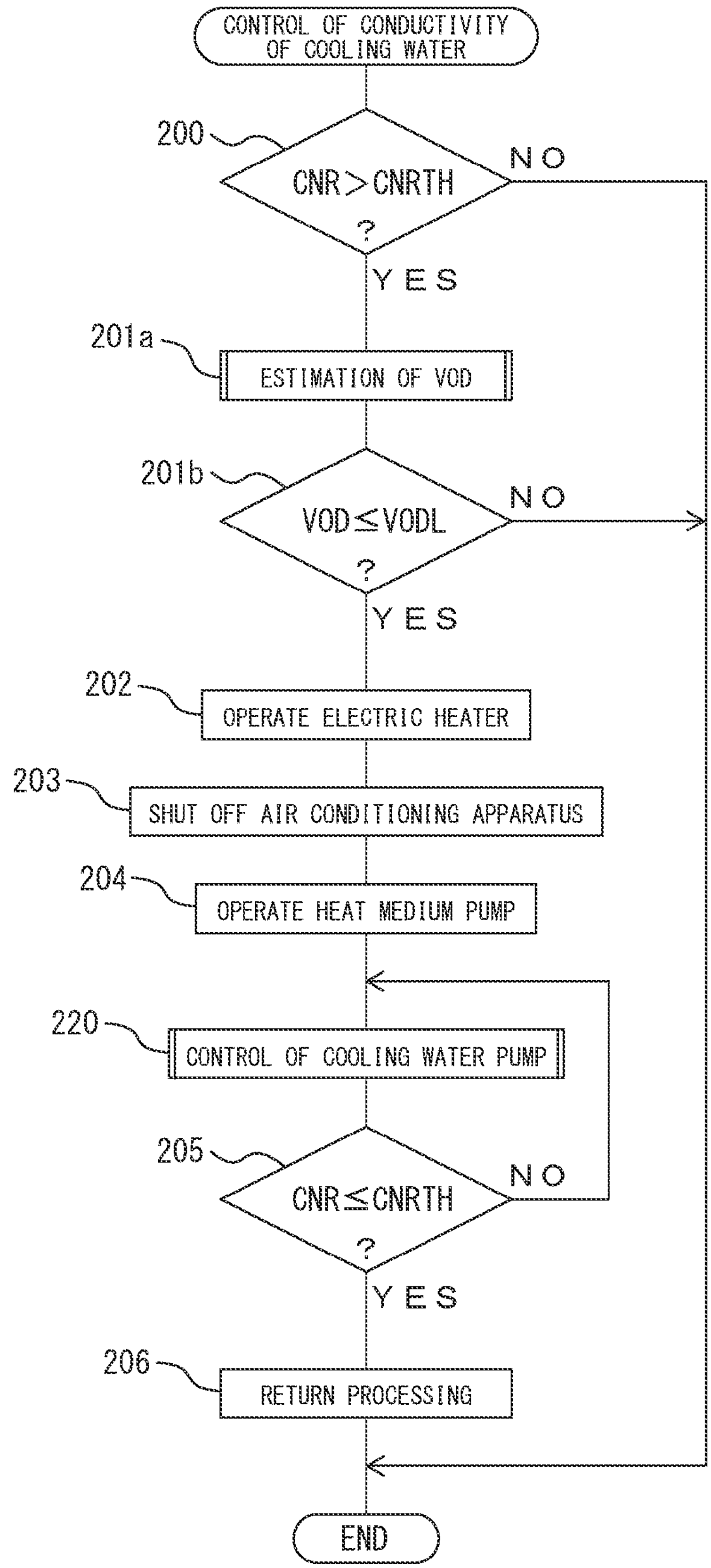
FIG. 20 is a flowchart representing the routine of the control of the conductivity of cooling water in an eleventh embodiment according to the present invention.

FIG. 20 represents the routine of the control of the conductivity of the cooling water in the eleventh embodiment according to the present invention. The routine differs from the routine represented in FIG. 15 in the following points. In other words, the process goes to step 220 following step 204, and the routine of the control of a cooling water pump represented in FIG. 18 is executed. Then, the process goes to step 205. In step 205, it is determined whether or not the conductivity CNR of cooling water around the radiator 53 is a threshold value CNRTH or less. The process goes to step 206 when CNR≤CNRTH is satisfied, and the process returns to step 220 when CNR>CNRTH is satisfied.

Next, a twelfth embodiment according to the present invention will be described. Its differences from the eighth embodiment according to the present invention will be described below.

In the twelfth embodiment according to the present invention, the amount of cooling water discharged from the cooling water pump 52 is temporarily decreased, thereby temporarily decreasing the amount of cooling water flowing in the thermostat valve 55, when it is judged that the necessity to cool the fuel cell stack 10 by cooling water is low in a case in which it is needed to increase the thermostat valve temperature TV by the air conditioning apparatus 60 in the eighth embodiment according to the present invention, in a manner similar to that of the ninth embodiment according to the present invention. As a result, a thermostat valve temperature TV can be immediately increased.

Figure 21:
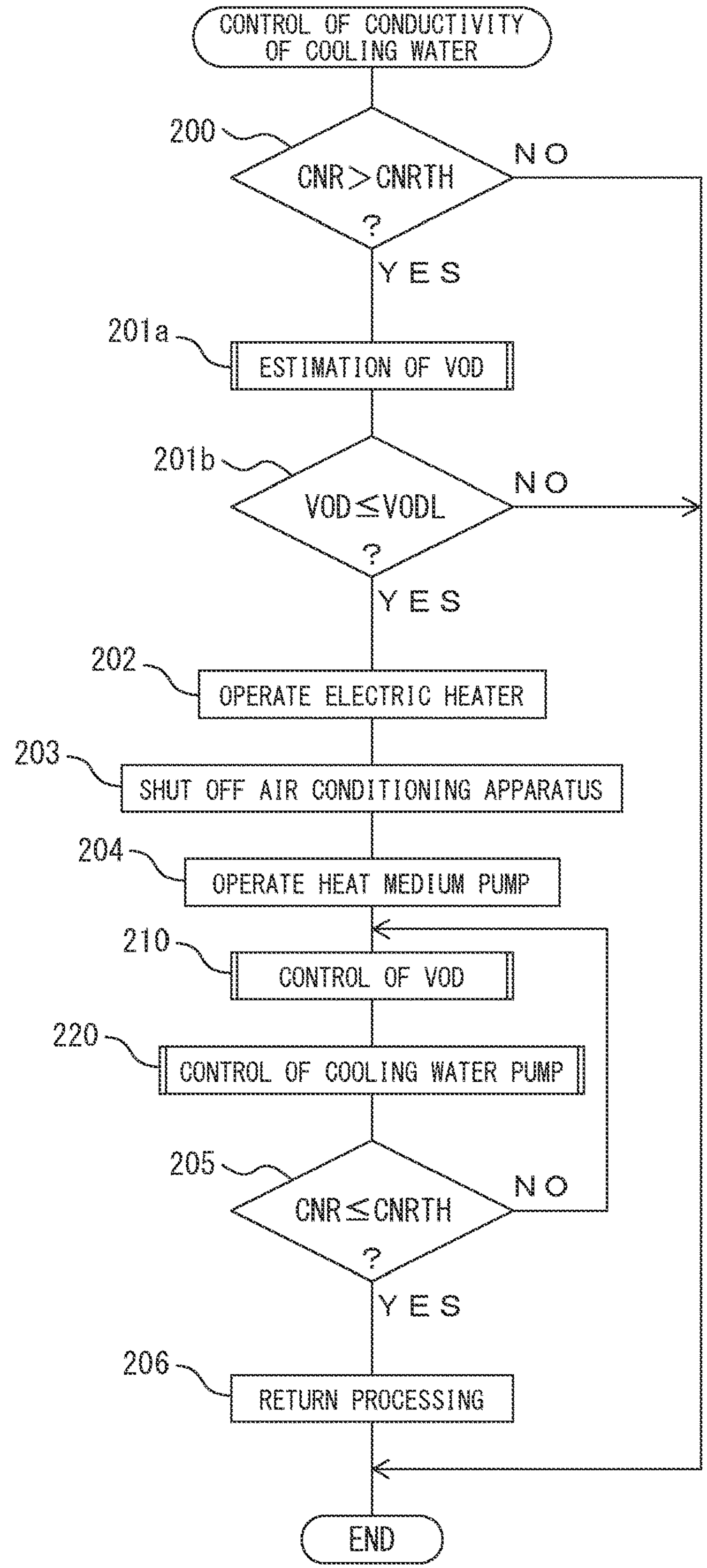
FIG. 21 is a flowchart representing the routine of the control of the conductivity of cooling water in a twelfth embodiment according to the present invention.

FIG. 21 represents the routine of the control of the conductivity of the cooling water in the twelfth embodiment according to the present invention. The routine differs from the routine represented in FIG. 16 in the following points. In other words, the process goes to step 220 following step 210, and the routine of the control of a cooling water pump represented in FIG. 18 is executed. Then, the process goes to step 205. In step 205, it is determined whether or not the conductivity CNR of cooling water around the radiator 53 is a threshold value CNRTH or less. The process goes to step 206 when CNR≤CNRTH is satisfied, and the process returns to step 210 when CNR>CNRTH is satisfied.

REFERENCE SIGNS LIST

A Fuel cell system
10 Fuel cell stack
51 Cooling water supply pipe
52 Cooling water pump
53 Radiator
54 Radiator bypass pipe
55 Thermostat valve
56 Housing
58 Ion exchanger
60 Air conditioning apparatus
61 Heat medium circulation pipe
61*a*, 61*b* Communicating pipe
62 Heat medium pump
63 Electric heater
64 Heat exchanger
65 Three-way valve

The invention claimed is:

1. A fuel cell system, comprising:

a fuel cell stack configured to generate power by an electrochemical reaction between fuel gas and oxidant gas;

a cooling water supply pipe connecting an inlet of a cooling water passage formed in the fuel cell stack, and an outlet of the cooling water passage to each other outside the fuel cell stack, whereby a circulation path for cooling water is formed;

a radiator arranged in the cooling water supply pipe;

a radiator bypass pipe connecting the cooling water supply pipe between the inlet of the cooling water passage in the fuel cell stack and the radiator, and the cooling water supply pipe between the outlet of the cooling water passage in the fuel cell stack and the radiator to each other;

a cooling water pump arranged in the cooling water supply pipe between the inlet of the cooling water passage in the fuel cell stack and the radiator bypass pipe, or in the cooling water supply pipe between the outlet of the cooling water passage in the fuel cell stack and the radiator bypass pipe, and configured to deliver cooling water;

a thermostat valve configured to control an amount of cooling water supplied to the radiator, and an amount of cooling water supplied into the radiator bypass pipe, in the cooling water flowing from the cooling water passage in the fuel cell stack into the cooling water supply pipe, the thermostat valve configured to supply a total amount of the cooling water to the radiator when a temperature of the thermostat valve is higher than a set temperature that is preset, and to supply at least the cooling water to the radiator bypass pipe when the temperature of the thermostat valve is lower than the set temperature;

an ion exchanger arranged in the radiator bypass pipe, and configured to perform ion exchange of cooling water;

an air conditioning apparatus comprising a heat medium circulation pipe through which a heat medium is circulated, a heat medium pump arranged in the heat medium circulation pipe and configured to deliver the heat medium, and a heat exchanger arranged in the heat medium circulation pipe and configured to perform heat exchange of air for air conditioning and the heat medium with each other; and a housing arranged in the heat medium circulation pipe, and disposed to surround the thermostat valve, wherein the air conditioning apparatus is configured to control a temperature of the heat medium in the housing, and the temperature of the thermostat valve is regulated from both a temperature of the cooling water that pass through the thermostat valve and the temperature of the heat medium in the housing.

2. The fuel cell system according to claim 1, further comprising:

a communicating pipe that allows the cooling water supply pipe between the inlet of the cooling water passage of the fuel cell stack and the radiator bypass pipe, or the cooling water supply pipe between the outlet of the cooling water passage and the radiator bypass pipe, and the heat medium circulation pipe to communicate with each other; and a control valve configured to control an amount of water flowing in the communicating pipe, wherein the heat medium comprises water;

water in the cooling water supply pipe can flow into the heat medium circulation pipe through the communicating pipe; and water in the heat medium circulation pipe can flow into the cooling water supply pipe through the communicating pipe.

3. The fuel cell system according to claim 1, further comprising:

an electric heater arranged in the heat medium circulation pipe and configured to heat the heat medium;

a three-way valve configured to control a communication between the cooling water supply pipe and the heat medium circulation pipe; and an electronic control unit configured to control the three-way valve, the heat medium pump and the electric heater, wherein the electronic control unit is configured to control the three-way valve so as to shut off the communication between the cooling water supply pipe and the heat medium circulation pipe, and to stop the electric heater and to operate the heat medium pump, when it is needed to decrease the temperature of the thermostat valve.

4. The fuel cell system according to claim 3, further comprising a conductivity sensor arranged in the cooling water supply pipe, and configured to measure a conductivity of the cooling water, wherein the electronic control unit is configured to determine that the temperature of the thermostat valve should be decreased when the conductivity measured by the conductivity sensor is higher than a predetermined threshold value and at least a part of the cooling water is flowing through the radiator.

5. The fuel cell system according to claim 1, further comprising:

an electric heater arranged in the heat medium circulation pipe and configured to heat the heat medium;

a three-way valve configured to control a communication between the cooling water supply pipe and the heat medium circulation pipe; and an electronic control unit configured to control the three-way valve, the heat medium pump and the electric heater, wherein the electronic control unit is configured to control the three-way valve so as to shut off the communication between the cooling water supply pipe and the heat medium circulation pipe, and to operate the electric heater and to operate the heat medium pump, when it is needed to increase the temperature of the thermostat valve.

6. The fuel cell system according to claim 5, further comprising a conductivity sensor arranged in the cooling water supply pipe between the outlet of the radiator and the radiator bypass pipe, and configured to measure a conductivity of the cooling water, wherein the electronic control unit is configured to determine that the temperature of the thermostat valve should be increased when the conductivity measured by the conductivity sensor is higher than a predetermined threshold value and at least a part of the cooling water is flowing through the radiator bypass pipe.

7. A method for controlling a fuel cell system comprising:

start control of a thermostat valve opening degree for an air conditioning apparatus when conductivity of cooling water exceeds a threshold value, wherein the fuel cell system comprising:

a fuel cell stack configured to generate power by an electrochemical reaction between fuel gas and oxidant gas;

a cooling water supply pipe connecting an inlet of a cooling water passage formed in the fuel cell stack, and an outlet of the cooling water passage to each other outside the fuel cell stack, whereby a circulation path for cooling water is formed;

a radiator arranged in the cooling water supply pipe;

a radiator bypass pipe connecting the cooling water supply pipe between the inlet of the cooling water passage in the fuel cell stack and the radiator, and the cooling water supply pipe between the outlet of the cooling water passage in the fuel cell stack and the radiator to each other;

a cooling water pump arranged in the cooling water supply pipe between the inlet of the cooling water passage in the fuel cell stack and the radiator bypass pipe, or in the cooling water supply pipe between the outlet of the cooling water passage and the radiator bypass pipe, and configured to deliver the cooling water;

a thermostat valve configured to control an amount of the cooling water supplied to the radiator, and an amount of the cooling water supplied into the radiator bypass pipe, in the cooling water flowing from the cooling water passage in the fuel cell stack into the cooling water supply pipe, the thermostat valve configured to supply a total amount of the cooling water to the radiator when a temperature of the thermostat valve is higher than a set temperature that is preset, and to supply at least the cooling water to the radiator bypass pipe when the temperature of the thermostat valve is lower than the set temperature;

an ion exchanger arranged in the radiator bypass pipe, and configured to perform ion exchange of cooling water;

the air conditioning apparatus comprising a heat medium circulation pipe through which a heat medium is circulated, a heat medium pump arranged in the heat medium circulation pipe and configured to deliver the heat medium, and a heat exchanger arranged in the heat medium circulation pipe and configured to perform heat exchange of air for air conditioning and the heat medium with each other; and a housing arranged in the heat medium circulation pipe, and disposed to surround the thermostat valve, wherein the air conditioning apparatus is configured to control a temperature of the heat medium in the housing, and the temperature of the thermostat valve is regulated from both a temperature of the cooling water that pass through the thermostat valve and the temperature of the heat medium in the housing.

8. The method for controlling a fuel cell system according to claim 7, wherein the fuel cell system further comprises:

an electric heater arranged in the heat medium circulation pipe and configured to heat the heat medium;

a three-way valve configured to control a communication between the cooling water supply pipe and the heat medium circulation pipe; and an electronic control unit configured to control the three-way valve, the heat medium pump and the electric heater, wherein the electronic control unit is configured to control the three-way valve so as to shut off the communication between the cooling water supply pipe and the heat medium circulation pipe, and to stop the electric heater and to operate the heat medium pump, when it is needed to decrease the temperature of the thermostat valve.

9. The method for controlling a fuel cell system according to claim 7, wherein the fuel cell system further comprises:

an electric heater arranged in the heat medium circulation pipe and configured to heat the heat medium;

a three-way valve configured to control a communication between the cooling water supply pipe and the heat medium circulation pipe; and an electronic control unit configured to control the three-way valve, the heat medium pump and the electric heater, wherein the electronic control unit is configured to control the three-way valve so as to shut off the communication between the cooling water supply pipe and the heat medium circulation pipe, and to operate the electric heater and to operate the heat medium pump, when it is needed to increase the temperature of the thermostat valve.

10. The method for controlling a fuel cell system according to claim 7, wherein the heat medium comprises water;

the fuel cell system further comprises: a communicating pipe that allows the cooling water supply pipe between the inlet of the cooling water passage of the fuel cell stack and the radiator bypass pipe, or the cooling water supply pipe between the outlet of the cooling water passage and the radiator bypass pipe, and the heat medium circulation pipe to communicate with each other; and a control valve configured to control an amount of water flowing in the communicating pipe;

water in the cooling water supply pipe can flow into the heat medium circulation pipe through the communicating pipe; and water in the heat medium circulation pipe can flow into the cooling water supply pipe through the communicating pipe.

* * * * *